US011749012B2

(12) United States Patent
Shih et al.

(10) Patent No.: US 11,749,012 B2
(45) Date of Patent: Sep. 5, 2023

(54) CHIP CAPABLE OF CONTROLLING PANE TO PERFORM FINGERPRINT SENSING

(71) Applicant: Novatek Microelectronics Corp., Hsinchu (TW)

(72) Inventors: Wei-Lun Shih, Hsinchu (TW); Wu-Wei Lin, Taoyuan (TW); Huang-Chin Tang, Hsinchu County (TW); Ting-Hsuan Hung, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/886,428

(22) Filed: Aug. 11, 2022

(65) Prior Publication Data

US 2022/0383654 A1 Dec. 1, 2022

Related U.S. Application Data

(63) Continuation of application No. 17/005,325, filed on Aug. 28, 2020, now Pat. No. 11,462,044.

(60) Provisional application No. 62/911,213, filed on Oct. 5, 2019, provisional application No. 62/896,593, filed on Sep. 6, 2019.

(51) Int. Cl.
*G06V 40/13* (2022.01)
*G09G 3/20* (2006.01)
*G06F 3/041* (2006.01)

(52) U.S. Cl.
CPC ........ *G06V 40/1306* (2022.01); *G06F 3/0412* (2013.01); *G09G 3/20* (2013.01); *G06F 3/04166* (2019.05); *G09G 2300/0408* (2013.01); *G09G 2354/00* (2013.01)

(58) Field of Classification Search
None
See application file for complete search history.

(56) References Cited

FOREIGN PATENT DOCUMENTS

CN 106326859 A * 1/2017 ......... G06K 9/00006

* cited by examiner

*Primary Examiner* — Nicholas J Lee
(74) *Attorney, Agent, or Firm* — JCIPRNET

(57) ABSTRACT

A chip capable of controlling a panel to perform fingerprint sensing is provided. Fingerprint sensing pixels of the panel are divided into a plurality of fingerprint zones along a first direction. The chip includes a control circuit. The control circuit provides multiple control signals for controlling the panel to perform fingerprint sensing. The control signals include multiple start pulse signals. The start pulse signals are used to indicate the selected fingerprint zone. The number of the fingerprint zones is greater than the number of the start pulse signals.

24 Claims, 24 Drawing Sheets

CHIP CAPABLE OF CONTROLLING PANE TO PERFORM FINGERPRINT SENSING

CROSS-REFERENCE TO RELATED APPLICATION

This application is a continuation application of and claims the priority benefit of a prior application Ser. No. 17/005,325 filed on Aug. 28, 2020, which claims the priority benefit of U.S. provisional application Ser. Nos. 62/896,593 and 62/911,213, filed on Sep. 6, 2019 and Oct. 5, 2019. The entirety of the above-mentioned patent application is hereby incorporated by reference herein and made a part of this specification.

BACKGROUND

Field of the Invention

The invention relates to a chip capable of controlling a panel to perform fingerprint sensing.

Description of Related Art

In a current full screen fingerprint technique, all fingerprint sensing pixels of a panel are divided into a first number of fingerprint zones along a column direction of the panel. Based on the number of the fingerprint zones, a plurality of wires and a plurality of leads that have corresponding numbers (equivalent to or greater than the first number) have to be disposed on the panel. These wires are used to be connected between these fingerprint zones and these leads. These leads occupy an area of the panel.

For example, if the fingerprint sensing pixels of the panel are divided into 10 fingerprint zones Zone1 to Zone10 along the column direction, each of left and right sides of the panel respectively requires 10 leads for driving the 10 fingerprint zones Zone1 to Zone10. 10 leads of a conventional fingerprint sensing control chip output 10 signals (start pulse signals) to the 10 leads at one of the sides of the panel, thereby resetting the fingerprint sensing pixels corresponding to the fingerprint zones. The other 10 leads of the conventional fingerprint sensing control chip output 10 signals (the start pulse signals) to the 10 leads at the other one of the sides of the panel, thereby selecting the fingerprint sensing pixels corresponding to the fingerprint zones. With the start pulse signals, the conventional fingerprint sensing control chip may inform the panel which one of the fingerprint zones among the fingerprint zones Zone1 to Zone10 requires to perform scanning on the fingerprint sensing pixel.

It may be conceivable that the greater the panel is (i.e., the greater the number of the fingerprint zones is), the greater the numbers of the wires and the leads disposed on the panel are. The greater numbers of the wires and/or the leads may result in a larger frame of the panel.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a chip capable of controlling a panel to perform fingerprint sensing, which can reduce the number of start pulse signals output by a chip to a panel as many as possible.

The invention provides a chip capable of controlling a panel to perform fingerprint sensing. The panel includes a plurality of fingerprint sensing pixels and a plurality of gate lines. The gate lines are arranged along a first direction of the panel for controlling the fingerprint sensing pixels. The fingerprint sensing pixels are divided into a first number of fingerprint zones along a second direction of the panel. The chip includes a control circuit. The control circuit is configured to provide a plurality of control signals to the panel for controlling the panel to perform fingerprint sensing. The control signals include a second number of start pulse signals. The second number of start pulse signals are used to indicate a selected fingerprint zone. The first number is greater than the second number. The second number of the start pulse signals are used to be provided to a decoder disposed on the panel, so that the decoder indicates the selected fingerprint zone according to logic values of the second number of the start pulse signals.

To sum up, the chip provided by the embodiments of the invention can output the start pulse signals to the panel, wherein the start pulse signals are related to one selected fingerprint zone among the first number of fingerprint zones of the panel. The panel can generate a plurality of scan signals according to the start pulse signals to be provided to the selected fingerprint zone. The number of the start pulse signals is less than the number of fingerprint zones. Thus, the electronic device can achieve reducing the number of start pulse signals provided by the chip to the panel as much as possible.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
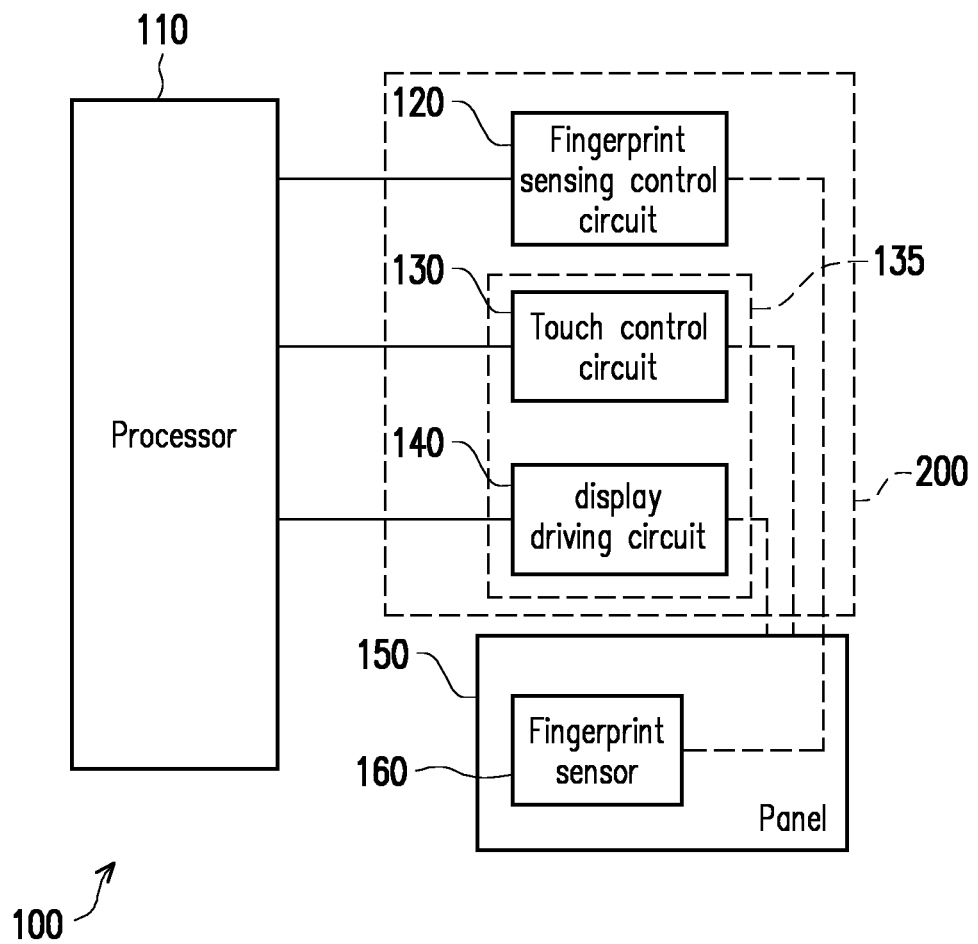
FIG. 1 is a schematic circuit block diagram illustrating an electronic device according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments.

Elements/components/notations with the same reference numerals in different embodiments may be referenced to the related description.

FIG. 1 is a schematic circuit block diagram illustrating an electronic device 100 according to an embodiment of the invention. The electronic device 100 may be a mobile device or other non-mobile devices. The electronic device 100 illustrated in FIG. 1 includes a processor 110, a fingerprint sensing control circuit 120, a touch control circuit 130, a display driving circuit 140 and a panel 150. It should be noted that even though the fingerprint sensing control circuit 120, the touch control circuit 130 and the display driving circuit 140 are illustrated as different circuit blocks, however, a part or all of each block may be integrated together with another one (or two) or all of the blocks. Based on a design requirement, in some embodiments, a part of or all of the fingerprint sensing control circuit 120, the touch control circuit 130 and the display driving circuit 140 may be embedded in a single chip or separated as different chips. The chip may communicate with the processor 110 and control the panel 150.

Based on a design requirement, in some embodiments, the processor 110 includes an application processor (AP), a central processing unit (CPU), a microcontroller or other processors (processing circuits). The processor 110 may be coupled to the display driving circuit 140 to provide an image frame. The display driving circuit 140 may be coupled (directly or indirectly) to the panel 150. The display driving circuit 140 may drive/control the display panel 150 to display an image in a display region of the panel 150.

Based on a design requirement, the panel 150 may be a touch display panel. For example, the panel 150 may include a touch detector (not shown). The touch control circuit 130 is coupled to (and controls) the touch detector of the panel 150. The touch control circuit 130 may control touch detection on the panel 150 to obtain a touched region corresponding to an object (e.g., a finger) on the panel 150. The processor 110 is coupled to the touch control circuit 130 to receive a result (a touched region) of the touch sensing.

The panel 150 may be any panel with a fingerprint sensing function. The specific structure of the panel 150 is not limited in the present embodiment. Based on a design requirement, the panel 150 may be display panel with an in-display fingerprint recognition function. For example, in some embodiments, the panel 150 further includes a fingerprint sensor 160, and fingerprint sensor 160 includes a plurality of fingerprint sensing pixels. Based on a design requirement, the fingerprint sensor 160 may be an optical fingerprint sensor or other fingerprint sensors, such as a capacitive fingerprint sensor.

The fingerprint sensor 160 may be placed under the panel 150. Or alternatively, the fingerprint sensor 160 may be embedded in the panel 150. Implementation details of the panel 150 may be determined based on a design requirement. For example, the fingerprint sensor 160 may be arranged in one of an on-display configuration, an under-display configuration, a local in-display configuration and a global in-display configuration. Alternatively, the fingerprint sensor 160 may be arranged in the other configurations.

A part (or all) of a display region of the panel 150 may be served as a sensing region of the fingerprint sensor 160 for sensing a fingerprint. Generally, as an area of the sensing region is increased, a degree of freedom in an operation of a user may be increased. The sensing region (the fingerprint sensor 160) may have a plurality of sensing units (the fingerprint sensing pixels). When a user presses a finger on any location of the sensing region of the panel 150, the fingerprint sensor 160 may sense/recognize a fingerprint of the user's finger. Based on a design requirement, in some embodiments, the panel 150 may perform optical fingerprint sensing, and the fingerprint sensor 160 of the panel 150 includes a plurality of optical fingerprint sensing pixels capable of sensing light.

The fingerprint sensing control circuit 120 may be coupled to the fingerprint sensor 160 of the panel 150 to control fingerprint sensing of the panel 150 and read a result of the fingerprint sensing. The processor 110 is coupled to the fingerprint sensing control circuit 120 to receive a sensing result (i.e., a sensing signal). Based on a design requirement, in some embodiments, the fingerprint sensing control circuit 120, the touch control circuit 130 and the display driving circuit 140 may be different integrated circuits. In some other embodiments, the touch control circuit 130 and the display driving circuit 140 may be integrated in a touch with display driver integration (TDDI) chip (or a TDDI circuit 135), and the fingerprint sensing control circuit 120 is implemented in another chip (or integrated circuit). The TDDI circuit 135 may control a touch operation and a display operation on the panel 150. In yet other embodiments, the fingerprint sensing control circuit 120 and the TDDI circuit 135 may be integrated in a single integrated circuit (chip) 200. The integrated circuit 200 may control fingerprint sensing of the panel 150, and control a touch operation and a display operation on the panel 150.

Figure 2:
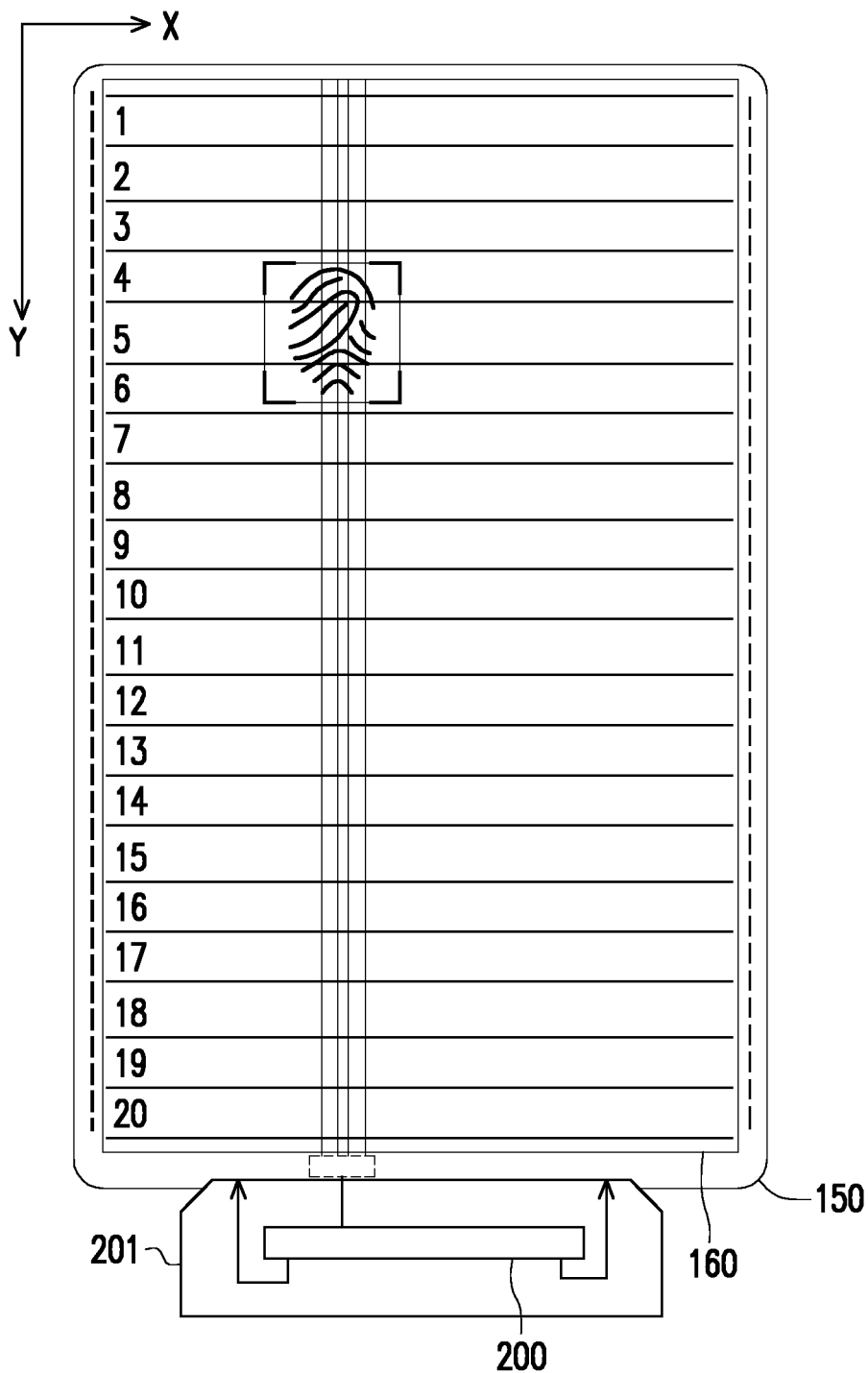
FIG. 2 is a schematic diagram illustrating the layout of the panel and the fingerprint sensor depicted in FIG. 1 according to an embodiment.

FIG. 2 is a schematic diagram illustrating the layout of the panel 150 and the fingerprint sensor 160 depicted in FIG. 1 according to an embodiment. The fingerprint sensor 160 has a plurality of fingerprint sensing circuits, and these fingerprint sensing circuits form an array. The flexible circuit board 201 is electrically connected to the panel 150, and the integrated circuit 200 is disposed on the flexible circuit board 201. According to design requirements, one or more of the fingerprint sensing control circuit 120, the touch control circuit 130, and the display driving circuit 140 may be configured in the integrated circuit 200. In the embodiment shown in FIG. 2, the fingerprint sensor 160 is divided into 20 fingerprint zones in the Y direction, and the X direction is one fingerprint zone. Each fingerprint area has a plurality of display rows, each display row has a plurality of display pixels, and each one (or more) display pixel(s) are equipped with a fingerprint sensing circuit.

Figure 3:
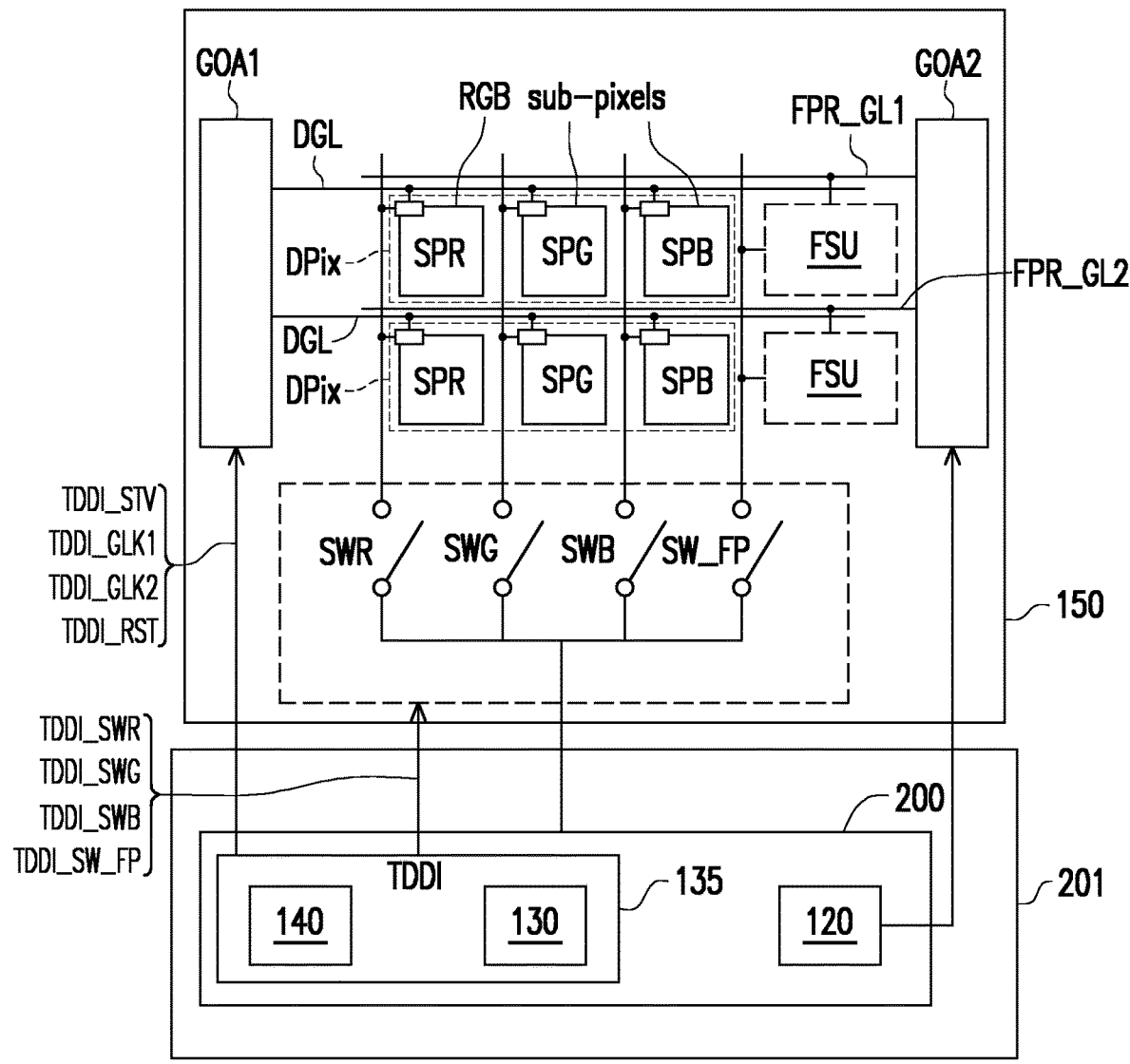
FIG. 3 is a schematic diagram illustrating a partial layout of the panel shown in FIG. 2 according to an embodiment.

For example, FIG. 3 is a schematic diagram illustrating a partial layout of the panel 150 shown in FIG. 2 according to an embodiment. In the embodiment shown in FIG. 3, the panel 150 has multiple display rows, and each display row has multiple display pixels DPix, and one display pixel DPix has a plurality of sub-pixels such as red sub-pixel SPR, a green sub-pixel SPG, and a blue sub-pixel SPB (not limited thereto). One or more gate on array (GOA) circuits, for example, a GOA circuit GOA1 of the panel 150 can be coupled to the display pixels DPix through multiple gate lines DGL. The GOA circuit GOA1 scans the gate lines DGL of the display pixels DPix according to the control of the TDDI circuit 135. The GOA circuit GOA1 can be implemented as one or more GOA circuit blocks. Moreover, the GOA circuit GOA1 can be disposed on one or two sides of the display panel.

Each one (or more) display pixel DPix may be equipped with or arranged along with a fingerprint sensing pixel FSU. One or more GOA circuits, for example, a GOA circuit GOA2 of the panel 150 can be coupled to the fingerprint sensing pixels FSU through multiple gate lines (e.g. FPR_GL1 and FPR_GL2). The GOA circuit GOA2 scans the gate lines FPR_GL1 and FPR_GL2 of the fingerprint sensing pixels FSU according to the control of the fingerprint sensing control circuit 120. According to design requirements, each of the gate lines FPR_GL1 and FPR_GL2 may be single wire or include multiple wires. Moreover, the GOA circuit GOA2 can be implemented as one or more GOA circuit blocks. Furthermore, the GOA circuit GOA2 can be disposed on one or two sides of the display panel. Accordingly, each of the gate lines FPR_GL1 and FPR_GL2 may include a reset wire for transmitting the scan signal FPR_GLi_RESET (shown in FIG. 4) and/or a selecting wire for transmitting the scan signal FPR_GLi_SEL/WRITE (shown in FIG. 4).

Figure 4:
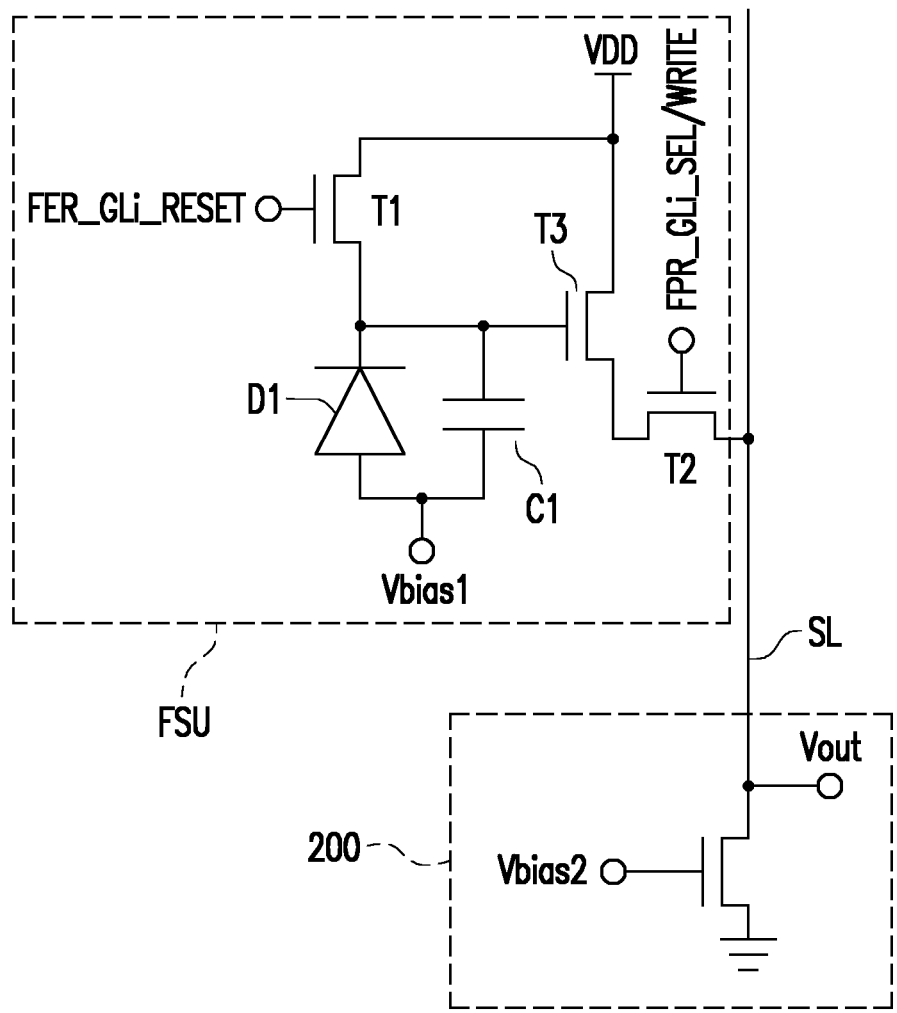
FIG. 4 is a circuit schematic diagram illustrating the fingerprint sensing pixel shown in FIG. 3 according to an embodiment.

As an example, the GOA circuit GOA2 including one or more GOA circuit blocks is implemented on one side of the display panel, and each of the gate lines FPR_GL1 and FPR_GL2 may include a reset wire for transmitting the scan signal FPR_GLi_RESET (shown in FIG. 4) and a selecting wire for transmitting the scan signal FPR_GLi_SEL/WRITE (shown in FIG. 4). As another example, a GOA circuit GOA2_1 (not shown) including one or more GOA circuit blocks is implemented on one side of the display panel, and each of the gate lines may include a reset wire for transmitting the scan signal FPR_GLi_RESET (shown in FIG. 4); and another GOA circuit GOA2_2 including one or more GOA circuit blocks is implemented on the other side of the display panel, and each of the gate lines may include a selecting wire for transmitting the scan signal FPR_GLi_SEL/WRITE (shown in FIG. 4). Different circuit arrangements for the GOA circuits for scanning the display pixels and fingerprint pixels can be made according to design requirements and are not limited in the disclosure.

FIG. 4 is a circuit schematic diagram illustrating a fingerprint sensing pixel according to an embodiment. The fingerprint sensing pixel can be the fingerprint sensing pixel FSU shown in FIG. 3 but is not limited thereto. In the embodiment shown in FIG. 4, the fingerprint sensing pixel FSU includes a switch T1, a switch T2, a transistor T3, a capacitor C1, and a photodiode D1. The switch T1 is controlled by the scan signal FPR_GLi_RESET. The scan signal FPR_GLi_RESET is configured to control the corresponding fingerprint sensing pixel FSU to perform resetting operation. The scan signal FPR_GLi_RESET may be one of the scan signals FPR_GL1_RESET, FPR_GL2_RESET and FPR_GL3_RESET shown in FIG. 5. The switch T2 is controlled by the scan signal FPR_GLi_SEL/WRITE. The scan signal FPR_GLi_SEL/WRITE is configured to control the corresponding fingerprint sensing pixel FSU to perform selecting/writing operation. The scan signal FPR_GLi_SEL/WRITE may be one of the scan signals FPR_GL1_SEL/WRITE, FPR_GL2_SEL/WRITE and FPR_GL3_SEL/WRITE shown in FIG. 5. The cathode of the photodiode D1 is coupled to the system voltage VDD through the switch T1. The anode of the photodiode D1 is coupled to a reference voltage Vbias1. Vbias2 shown in FIG. 4 is another reference voltage. A bias circuit which for example, includes the N-type metal-oxide-semiconductor (NMOS) transistor controlled by the reference voltage Vbias2, can be coupled to the fingerprint pixel to draw current from the sensing line SL. According to design requirements, the NMOS transistor controlled by the reference voltage Vbias2 can be implemented in or outside the integrated circuit 200. Different structures of the fingerprint sensing pixel can be implemented, not limited in the disclosure.

Figure 5:
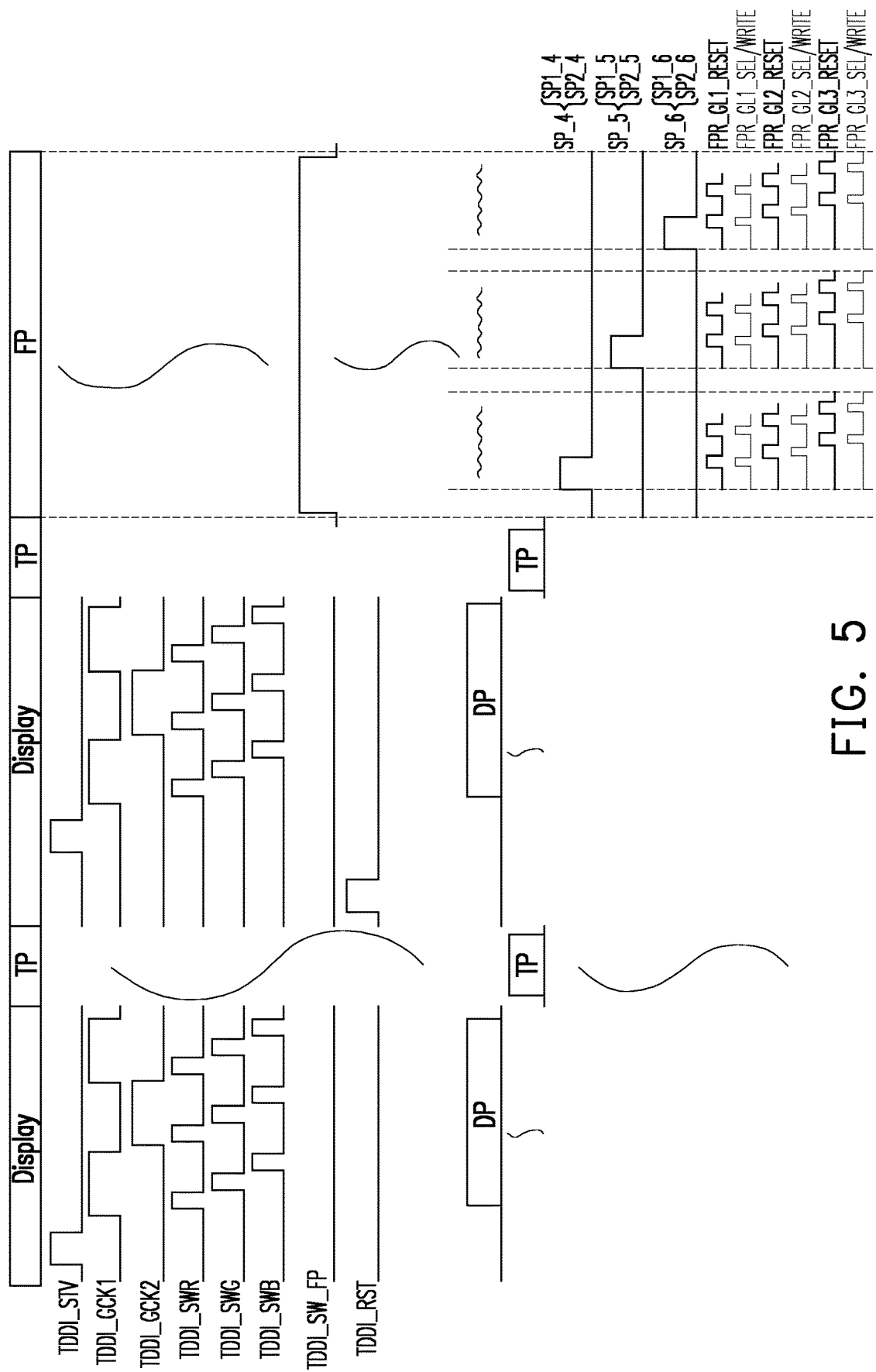
FIG. 5 is a schematic diagram illustrating signal timing of the integrated circuit shown in FIG. 3 according to an embodiment.

FIG. 5 is a schematic diagram illustrating a signal timing of chip capable of controlling a panel to perform fingerprint sensing according to an embodiment. The chip may be implemented as the integrated circuit 200 shown in FIG. 3 but is not limited thereto. In the embodiment shown in FIG. 5, the signal TDDI STV represents the start pulse for the display driving operation. The signals TDDI GCK1 and TDDI GCK2 represent clock signals used for display driving operations. The signal TDDI SWR represents the control signal of the switch SWR shown in FIG. 3. The signal TDDI SWG represents the control signal of the switch SWG shown in FIG. 3. The signal TDDI SWB represents the control signal of the switch SWB shown in FIG. 3. The signal TDDI SW FP represents the control signal of the switch SW FP shown in FIG. 3. The operation DP represents a display driving operation performed by the integrated circuit 200. The operation TP represents the touch sensing driving operation by the integrated circuit 200. The operation FP represents the fingerprint sensing driving operation performed by the integrated circuit 200. The start pulse signals SP_4, SP_5 and SP_6 represent the start pulses for the fingerprint sensing driving operation FP. The scan signals FPR_GL1_RESET, FPR_GL2_RESET and FPR_GL3_RESET represent reset signals for the fingerprint sensing driving operation FP. The scan signals FPR_GL1_SEL/WRITE, FPR_GL2_SEL/WRITE and FPR_GL3_SEL/WRITE represent selection signals for the fingerprint sensing driving operation FP.

In the first step, the integrated circuit 200 performs a fingerprint sensing driving operation FP to sequentially output the start pulse signals SP_4, SP_5 and SP_6 shown in FIG. 5 to the panel 150. The start pulse signal SP_4 may include one or more start pulses such as the start pulse signals SP1_4 and SP2_4, the start pulse signal SP_5 may include one or more start pulse signals such as the start pulses SP1_5 and SP2_5, and the start pulse signal SP_6 may include the start pulse signals such as the start pulses SP1_6 and SP2_6. In some implementations, the start pulse signals SP_i (e.g. the start pulse signals SP_4, SP_5 and SP_6) may be used to generate the scan signal FPR_GLi_RESET (e.g. the scan signals FPR_GL1_RESET, FPR_GL2_RESET and FPR_GL3_RESET) and also used to generate the scan signals FPR_GLi_SEL/WRITE (e.g. the scan signals FPR_GL1_SEL/WRITE, FPR_GL2_SEL/WRITE and FPR_GL3_SEL/WRITE).

Figure 7A:
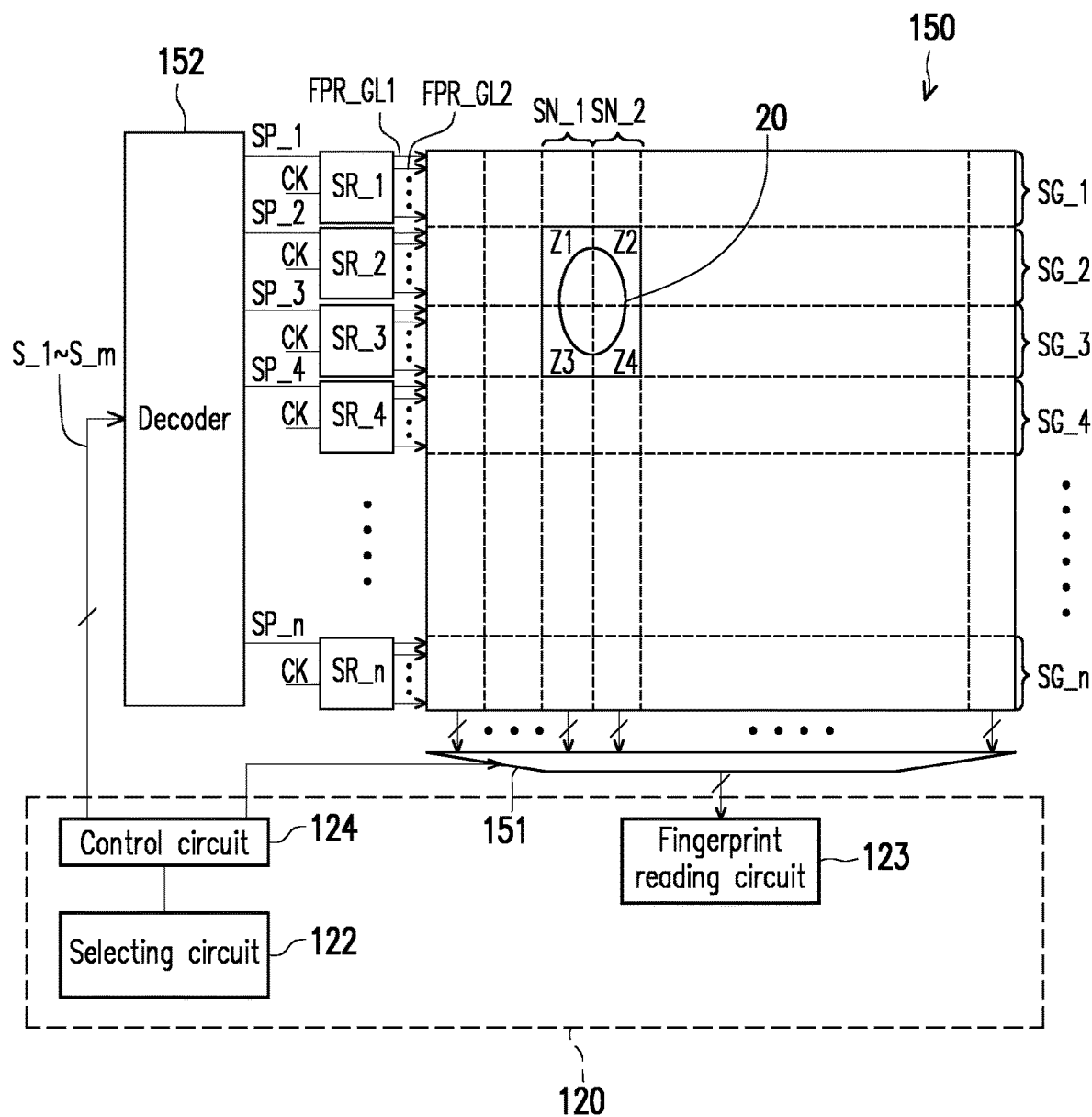
FIG. 7A is a schematic circuit block diagram illustrating the fingerprint sensing control circuit depicted in FIG. 1 according to an embodiment of the invention.

The start pulse signals SP_i may be generated by a GOA circuit on one side of the display panel, as will explained more in FIG. 7A. Additionally or alternatively, the start pulse signals SP1_i (e.g. the start pulse signals SP1_4, SP1_5 and SP1_6) may be used to generate the scan signal FPR_GLi_RESET (e.g. the scan signals FPR_GL1_RESET, FPR_GL2_RESET and FPR_GL3_RESET), and the start pulse signals SP2_i (e.g. the start pulse signals SP2_4, SP2_5 and SP2_6) can be used to generate the scan signals FPR_GLi_SEL/WRITE (e.g. the scan signals FPR_GL1_SEL/WRITE, FPR_GL2_SEL/WRITE and FPR_GL3_SEL/WRITE). The scan signal FPR_GLi_RESET sequentially turns on the reset switch T1 of each fingerprint sensing pixel FSU, so the cathode of the photodiode D1 is reset to VDD (eg 5V). The start pulse signals SP1_i may be generated by a GOA circuit on one side of the display panel, and the start pulse signals SP2_i may be generated by another GOA circuit on the other side of the display panel, as will explained more in FIG. 7B.

In the second step, the scan signal FPR_GLi_RESET (e.g. the scan signals FPR_GL1_RESET, FPR_GL2_RESET or FPR_GL3_RESET) turns off the reset switch T1, and the voltage across the photodiode D1 is 5V. When the light shines on the fingerprint, it can generate reflected light. The reflected light illuminates the photodiode D1, which accelerates the discharge speed of the photodiode D1. The reflected light of the fingerprint peak is brighter, which makes the resistance of the photodiode D1 smaller, and the cathode discharge speed is faster, resulting in a lower cathode voltage (for example, about 2V). The reflected light of the fingerprint valley is darker, which makes the resistance of the photodiode D1 larger. At this time, the cathode discharge speed is slow, resulting in a large cathode voltage (for example, about 3V).

In the third step, the scan signals FPR_GLi_SEL/WRITE (e.g. the scan signals FPR_GL1_SEL/WRITE, FPR_GL2_SEL/WRITE or FPR_GL3_SEL/WRITE) sequentially turns on the switch T2 of each fingerprint sensing pixel FSU, and transmits the cathode voltage of the photodiode D1 to the fingerprint sensing line as the output voltage Vout. In the fingerprint sensing driving operation FP, the control signal TDDI SW FP is a high logic level (the control signals TDDI SWR, TDDI SWG, and TDDI SWB are low logic levels) to select (enable) the fingerprint sensing drive operation FP. At this time, the analog front end (AFE) circuit of the fingerprint sensing control circuit 120 can read the sensing result Vout1 (the output voltage Vout) of the fingerprint sensing pixel FSU.

In the fourth step, the scan signal FPR_GLi_RESET turns on the reset switch T1, and the cathode of the photodiode D1 is reset to the system voltage VDD (for example, 5V) again. The system voltage VDD is transmitted to the fingerprint sensing line as the output voltage Vout. At this time, the AFE circuit of the fingerprint sensing control circuit 120 can read the reset result Vout2 (the output voltage Vout). In the fifth step, the fingerprint sensing control circuit 120 may subtract the reset result Vout2 and the sensing result Vout1 to obtain fingerprint information.

Figure 6:
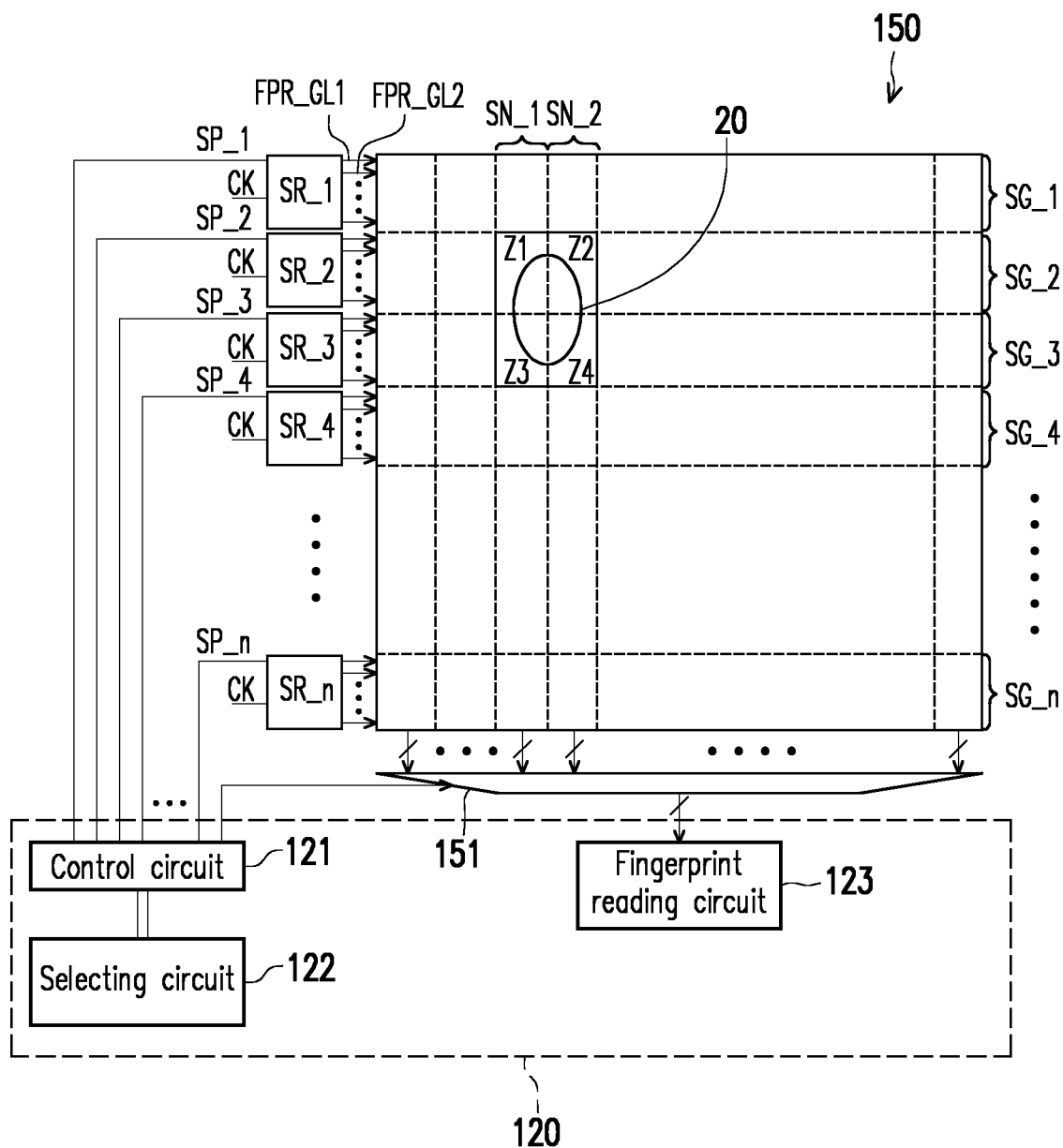
FIG. 6 is a schematic circuit block diagram illustrating the fingerprint sensing control circuit depicted in FIG. 1 according to an embodiment.

FIG. 6 is a schematic circuit block diagram illustrating a fingerprint sensing control circuit according to an embodiment. The fingerprint sensing control circuit may be implemented as the fingerprint sensing control circuit 120 depicted in FIG. 1 but is not limited thereto in the disclosure. In the example illustrated in FIG. 6, all the fingerprint sensing pixels in the sensing region of the panel 150 are divided into a plurality of fingerprint sensing blocks (i.e., a plurality of small blocks illustrated in FIG. 6, such as the fingerprint sensing blocks Z1, Z2, Z3 and Z4 illustrated in FIG. 6). Referring to FIG. 1 and FIG. 6, the touch control circuit 130 may perform the touch detection on the panel 150 to obtain a touched region 20 corresponding to the finger on the display panel 150.

The panel 150 further includes a plurality of gate lines arranged along a first direction (e.g., row direction) of the panel 150, for example, the gate lines FPR_GL1 and FPR_GL2 illustrated in FIG. 6. According to design requirements, each of the gate lines (e.g. the gate lines FPR_GL1 and FPR_GL2) may be single wire or include multiple wires. For example, the gate line FPR_GL1 may include a reset wire for transmitting the scan signal FPR_GL1_RESET (shown in FIG. 5) and a selecting wire for transmitting the scan signal FPR_GL1_SEL/WRITE (shown in FIG. 5). The gate line FPR_GL2 may include a reset wire for transmitting the scan signal FPR_GL2_RESET (shown in FIG. 5) and a selecting wire for transmitting the scan signal FPR_GL2_SEL/WRITE (shown in FIG. 5). The gate lines are used to control the fingerprint sensing pixels of the panel 150. The fingerprint sensing pixels of the panel 150 are divided into a first number of fingerprint zones, for example, fingerprint zones SG_1, SG_2, SG_3, SG_4, . . . and SG_n illustrated in FIG. 6, along a second direction (e.g., column direction) of the panel 150 (the first number is an arbitrary integer n). Each of the fingerprint zones SG_1 to SG_n is coupled to corresponding one or more gate lines among the gate lines of the panel 150.

A gate on array (GOA) circuit of the panel 150 includes one or more shift register groups, for example, shift register groups SR_1, SR_2, SR_3, SR_4, . . . and SR_n illustrated in FIG. 6, wherein n may be an arbitrary integer determined based on a design requirement. Each of the fingerprint zones SG_1 to SG_n may be coupled to a corresponding one of the shift register groups SR_1 to SR_n, as illustrated in FIG. 6. Each of the shift register groups SR_1 to SR_n may receive one of start pulse signals SP_1, SP_2, SP_3, SP_4, . . . and SP_n of the fingerprint sensing control circuit 120. One or more clock signals CK may trigger the shift register groups SR_1 to SR_n. Implementation details of the shift register groups SR_1 to SR_n are not limited in the present embodiment. Based on a design requirement, in some embodiments, any one of the shift register groups SR_1 to SR_n may include a conventional shifting register or other shifting register circuits.

In the embodiment illustrated in FIG. 6, the fingerprint sensing control circuit 120 (the chip) may control the panel 150 to perform the fingerprint sensing. Based on touch sensing of the touch control circuit 130, the fingerprint sensing control circuit 120 (the chip) may further obtain the touched region 20 corresponding to the object (e.g., the finger) on the panel 150. According to touched region 20, the fingerprint sensing control circuit 120 (the chip) may select one or more fingerprint zones (e.g., fingerprint zones SG_2 and SG_3) encompassing the touched region 20 from the fingerprint zones SG_1 to SG_n. Namely, the fingerprint sensing control circuit 120 (the chip) may obtain information about the selected fingerprint zones SG_2 and SG_3 (the touched region 20).

In the embodiment illustrated in FIG. 6, the fingerprint sensing control circuit 120 (the chip) includes a control circuit 121, a selecting circuit 122 and a fingerprint reading circuit 123. The selecting circuit 122 may obtain the information about the touched region 20. Based on a design requirement, in some embodiments, the processor 110 may provide the information to the selecting circuit 122. According to touch information from the touch control circuit 130, the processor 110 may determine the selected fingerprint zone. In some other embodiments, the touch control circuit 130 may provide the information to the selecting circuit 122. According to the information of the touched region 20, the fingerprint sensing control circuit 122 may select the selected fingerprint zones (e.g., the fingerprint zones SG_2 and SG_3) encompassing the touched region 20 from the fingerprint zones SG_1 to SG_n. The selecting circuit 122 may provide the information about the selected fingerprint zones SG_2 and SG_3 to the control circuit 121.

The control circuit 121 is coupled to the fingerprint sensing circuit 122 to receive the information about the selected fingerprint zones SG_2 and SG_3. The control circuit 121 may provide a plurality of control signals (including the start pulse signals SP_1 to SP_n) to the panel 150 for controlling the panel 150 to perform the fingerprint sensing. In the embodiment illustrated in FIG. 6, the start pulse signal and the selected fingerprint sensing zone has a simple one-to-one mapping relationship. More specifically, the fingerprint sensing control circuit 120 apply a pulse into the start pulse signals SP_1 when the fingerprint zones SG_1 is selected for scanning. The fingerprint sensing control circuit 120 apply a pulse into the start pulse signals SP_2 when the fingerprint zones SG_2 is selected for scanning. The fingerprint sensing control circuit 120 apply a pulse into the start pulse signals SP_3 when the fingerprint zones SG_3 is selected for scanning. The fingerprint sensing control circuit 120 apply a pulse into the start pulse signals SP_4 when the fingerprint zones SG_4 is selected for scanning. The fingerprint sensing control circuit 120 apply a pulse into the start pulse signals SP_n when the fingerprint zones SG_n is selected for scanning. Accordingly, the number of the start pulse signals SP_1 to SP_n is equal to the number of the fingerprint zones SG_1 to SG_n. According to the information about the selected fingerprint zones SG_2 and SG_3 (determined according to the touched region 20), the control circuit 121 applies a pulse to the start pulse signals SP_2 and SP_3 of target shift register groups SR_2 and SR_3 and does not apply the pulse to the start pulse signals SP_1 and SP_4 to SP_n of other shift register groups SR_1 and SR_4 to SR_n.

In the row direction of the display panel 150, the fingerprint sensing blocks of the panel 150 (e.g., the fingerprint sensing blocks Z1, Z2, Z3 and Z4 illustrated in FIG. 6) are divided into a plurality of sensing groups, for example, sensing groups SN_1 and SN_2 illustrated in FIG. 6. Each of the sensing groups includes one or more sensing lines. A multiplexer circuit 151 is coupled to the sensing groups of the panel 150. The fingerprint reading circuit 123 is coupled to the multiplexer circuit 151. Based on a design requirement, the multiplexer circuit 151 may be disposed on the panel 150 or within the fingerprint sensing control circuit 120. The control circuit 121 may control the multiplexer circuit 151 to turn on a plurality of signal paths from the target sensing groups SN_1 and SN_2 to the fingerprint reading circuit 123 and turn off a plurality of signal paths from the sensing groups other than the target sensing groups SN_1 and SN_2 among the sensing groups to the fingerprint reading circuit 123.

Generally, the larger the panel 150 is, the greater the total number n of the fingerprint zones SG_1 to SG_n is. The greater the total number n of the fingerprint zones SG_1 to SG_n is, the greater the numbers of wires and leads for transmitting the start pulse signals SP_1 and SP_4 to SP_n are. The wires and the leads occupy a frame area of the panel 150.

FIG. 7A is a schematic circuit block diagram illustrating the fingerprint sensing control circuit 120 depicted in FIG. 1 according to an embodiment of the invention. A panel 150, a multiplexer circuit 151, a plurality of gate lines including FPR_GL1 to FPR_GL2, fingerprint zones SG_1 to SG_n, sensing groups including SN_1 to SN_2, shift register groups SR_1 to SR_n and fingerprint sensing blocks including Z1 to Z4 illustrated in FIG. 7A may be inferred with reference to the descriptions related to those illustrated in FIG. 6 and thus, will not be repeatedly described.

In the example illustrated in FIG. 7A, the fingerprint sensing control circuit 120 (the chip) includes a control circuit 124, a selecting circuit 122 and a fingerprint reading circuit 123. The control circuit 124, the selecting circuit 122 and the fingerprint reading circuit 123 illustrated in FIG. 7A may be inferred with reference to the descriptions related to the control circuit 121, the selecting circuit 122 and the fingerprint reading circuit 123 illustrated in FIG. 6 and thus, will not be repeatedly described.

In the example illustrated in FIG. 7A, the control circuit 124 is coupled to the selecting circuit 122 to receive the information about the selected fingerprint zones SG_2 and SG_3. The control circuit 124 may provide a plurality of control signals (including the start pulse signals S_1 to S_m) to the panel 150 for controlling the panel 150 to perform fingerprint sensing. The start pulse signals S_1 to S_m are used to control a plurality of gate lines (e.g., the gate lines FPR_GL1 and FPR_GL2 illustrated in FIG. 7A) of the panel 150. The start pulse signals S_1 to S_m may be used to indicate the selected fingerprint zones (e.g., the fingerprint zones SG_2 and SG_3). Compared to FIG. 6 where the selection for each of the fingerprint zones SG_1 to SG_n depend upon a single corresponding one of the start pulse signals S_1 to S n, the selection for each of the fingerprint zones SG_1 to SG_n may depend upon more than one, e.g., all of the start pulse signals S_1 to S_m in FIG. 7A.

For example, the start pulse signals S_1 to S_m are provided to a decoder 152 of a GOA circuit (e.g., GOA2 of FIG. 2) on the panel 150. The decoder 152 is disposed on the panel 150. The decoder 152 obtains the information about the selected fingerprint zones SG_2 and SG_3 according to a plurality of logic values of the start pulse signals S_1 to S_m. Namely, the decoder 152 may generate start pulse signals SP_1 to SP_n according to the start pulse signals S_1 to S_m and provide the start pulse signals SP_1 to SP_n respectively to the shift register groups SR_1 to SR_n of the GOA circuit GOA2. The GOA circuit GOA2 comprises the shift register groups SR_1 to SR_n, each of which may be coupled to a corresponding one of the fingerprint zones SG_1 to SG_n and operating according to more than one (e.g., all) of the start pulse signals S_1 to S_m. That is, after receiving the signal, the panel 150 can decode the signal to know which area should be operated. The start pulse signals SP_1 to SP_n illustrated in FIG. 7A may be inferred with reference to the description related to the start pulse signals SP_1 to SP_n illustrated in FIG. 6 and thus, will not be repeatedly described. The shift register groups SR_1 to SR_n of the GOA circuit GOA2 are configured to generate a plurality of scan signals. The scan signals are respectively used to control a plurality of gate lines (e.g., the gate lines FPR_GL1 and FPR_GL2 illustrated in FIG. 7A) of the panel 150.

In the embodiment illustrated in FIG. 7A, the number n of the fingerprint zones SG_1 to SG_n is greater than the number m of the start pulse signals S_1 to S_m. By reducing the number of the start pulse signals between the fingerprint sensing control circuit 120 (the chip) and the panel 150, the numbers of wires and leads for transmitting the start pulse signals may be effectively reduced. The reduction of the wires and the leads may contribute to reducing the frame area of the panel 150.

Figure 7B:
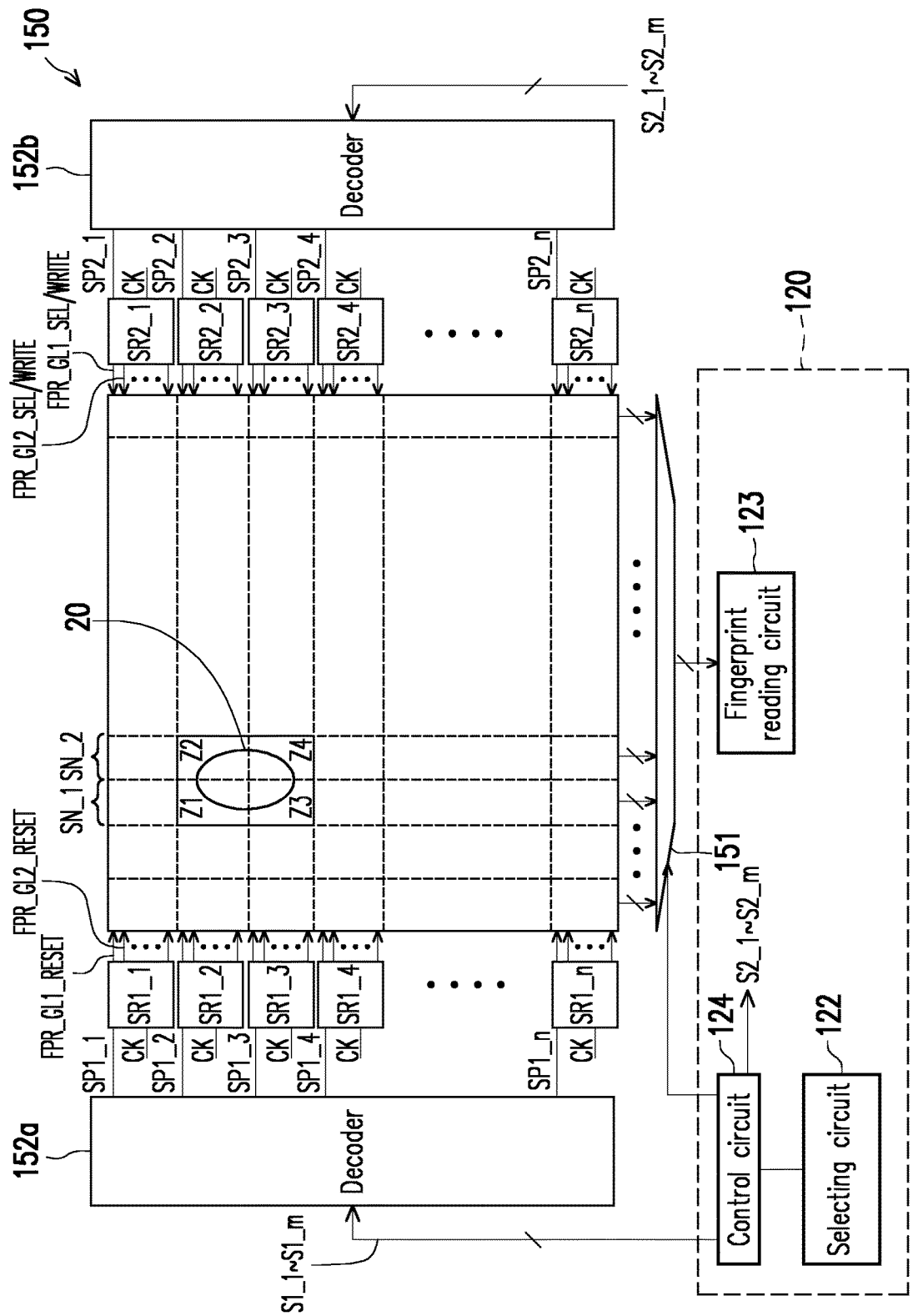
FIG. 7B is a schematic circuit block diagram illustrating the fingerprint sensing control circuit depicted in FIG. 1 according to another embodiment of the invention.

FIG. 7B is a schematic circuit block diagram illustrating the fingerprint sensing control circuit 120 depicted in FIG. 1 according to another embodiment of the invention. The panel 150, a multiplexer circuit 151, sensing groups SN_1 to SN_2 and fingerprint sensing blocks Z1 to Z4 illustrated in FIG. 7B may be inferred with reference to the descriptions related to those illustrated in FIG. 6 and thus, will not be repeatedly described. The shift register groups SR1_1, SR1_2, SR1_3, SR1_4, . . . SR1_n may be inferred with reference to the shift register groups SR_1 to SR_n illustrated in FIG. 7A, and the shift register groups SR2_1, SR2_2, SR2_3, SR2_4, . . . SR2_n illustrated in FIG. 7B may be inferred with reference to the shift register groups SR_1 to SR_n illustrated in FIG. 7A.

In the example illustrated in FIG. 7B, the fingerprint sensing control circuit 120 (the chip) includes a control circuit 124, a selecting circuit 122 and a fingerprint reading circuit 123. The control circuit 124, the selecting circuit 122 and the fingerprint reading circuit 123 illustrated in FIG. 7B may be inferred with reference to the descriptions related to the control circuit 121, the selecting circuit 122 and the fingerprint reading circuit 123 illustrated in FIG. 7A and thus, will not be repeatedly described.

In the example illustrated in FIG. 7B, the control circuit 124 is coupled to the selecting circuit 122 to receive the information about the selected fingerprint zones SG_2 and SG_3. The control circuit 124 may provide a plurality of control signals (including the start pulse signals S1_1 to S1_m) to the panel 150 for controlling the panel 150 to perform fingerprint sensing. The start pulse signals S1_1 to S1_m are used to control a plurality of gate lines (e.g., the reset wires for transmitting the scan signals FPR_GL1_RESET and FPR_GL2_RESET illustrated in FIG. 7B) of the panel 150. The start pulse signals S1_1 to S1_m may collectively indicate the selected fingerprint zones (e.g., the fingerprint zones SG_2 and SG_3). The start pulse signals S1_1 to S1_m illustrated in FIG. 7B may be inferred with reference to the descriptions related to the start pulse signals S_1 to S_m illustrated in FIG. 7A.

For example, the start pulse signals S1_1 to S1_m are provided to a decoder 152a of a GOA circuit GOA2 on the panel 150. The decoder 152a is disposed on the panel 150. The decoder 152a obtains the information about the selected fingerprint zones SG_2 and SG_3 according to a plurality of logic values of the start pulse signals S1_1 to S1_m. Namely, the decoder 152a may generate start pulse signals SP1_1, SP1_2, SP1_3, SP1_4, . . . SP1_n according to the start pulse signals S1_1 to S1_m and provide the SP1_1, SP1_2, SP1_3, SP1_4, . . . SP1_n to the shift register groups SR1_1 to SR1_n of the GOA circuit GOA2. The decoder 152a illustrated in FIG. 7B may be inferred with reference to the decoder 152 illustrated in FIG. 7A. The start pulse signals SP1_1 to SP1_n illustrated in FIG. 7B may be inferred with reference to the description related to the start pulse signals SP_1 to SP_n illustrated in FIG. 6 and thus, will not be repeatedly described. The shift register groups SR1_1 to SR1_n of the GOA circuit GOA2 are configured to generate a plurality of scan signals. The scan signals are respectively used to control a plurality of gate lines (e.g., the reset wires for transmitting the scan signals FPR_GL1_RESET and FPR_GL2_RESET illustrated in FIG. 7B) of the panel 150.

In the example illustrated in FIG. 7B, the control circuit 124 may provide a plurality of control signals (including the start pulse signals S2_1 to S2_m) to the panel 150 for controlling the panel 150 to perform fingerprint sensing. The start pulse signals S2_1 to S2_m are used to control a plurality of gate lines (e.g., the selecting wires for transmitting the scan signals FPR_GL1_SEL/WRITE and FPR_GL2_SEL/WRITE illustrated in FIG. 7B) of the panel 150.

The start pulse signals S2_1 to S2_m may collectively indicate the selected fingerprint zones (e.g., the fingerprint zones SG_2 and SG_3). The start pulse signals S2_1 to S2_m illustrated in FIG. 7B may be inferred with reference to the descriptions related to the start pulse signals S_1 to S_m illustrated in FIG. 7A.

For example, the start pulse signals S2_1 to S2_m are provided to a decoder 152b of a GOA circuit GOA2 on the panel 150. The decoder 152b is disposed on the panel 150. The decoder 152b obtains the information about the selected fingerprint zones SG_2 and SG_3 according to a plurality of logic values of the start pulse signals S2_1 to S2_m. Namely, the decoder 152b may generate start pulse signals SP2_1, SP2_2, SP2_3, SP2_4, . . . SP2_n according to the start pulse signals S2_1 to S2_m and provide the start pulse signals SP2_1, SP2_2, SP2_3, SP2_4, . . . SP2_n to the shift register groups SR2_1 to SR2_n of the GOA circuit GOA2. The decoder 152b illustrated in FIG. 7B may be inferred with reference to the decoder 152 illustrated in FIG. 7A. The start pulse signals SP2_1 to SP2_n illustrated in FIG. 7B may be inferred with reference to the description related to the start pulse signals SP_1 to SP_n illustrated in FIG. 6 and thus, will not be repeatedly described. The shift register groups SR2_1 to SR2_n of the GOA circuit GOA2 are configured to generate a plurality of scan signals. The scan signals are respectively used to control a plurality of gate lines (e.g., the selecting wires for transmitting the scan signals FPR_GL1_SEL/WRITE and FPR_GL2_SEL/WRITE illustrated in FIG. 7B) of the panel 150.

It is noted although two decoders are illustrated in FIG. 7B, in different embodiments, one decoder can be used to provide the start pulse signals SP_1 to SP_n respectively to the shift register groups SR_1 to SR_n and provide the start pulse signals SP2_1, SP2_2, SP2_3, SP2_4, . . . SP2_n to the shift register groups SR2_1 to SR2_n.

Figure 8:
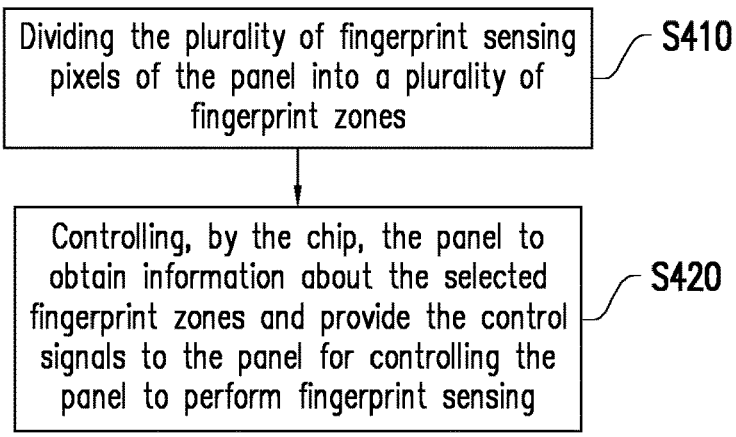
FIG. 8 is a flowchart illustrating an operation method according to an embodiment of the invention.

FIG. 8 is a flowchart illustrating an operation method according to an embodiment of the invention. Referring to FIG. 1, FIG. 7A and FIG. 8, in step S410, the plurality of fingerprint sensing pixels of the panel 150 are divided into a first number n of fingerprint zones SG_1 to SG_n along the column direction of the panel 150. Each of the fingerprint zones SG_1 to SG_n is coupled to corresponding one or more gate lines (e.g., the gate lines FPR_GL1 to FPR_GL2 illustrated in FIG. 7A) among the gate lines of the panel 150. In step S410, the gate lines are arranged along the row direction of the panel 150 for controlling the fingerprint sensing pixels of the panel 150. In step S410, the decoder 152 is disposed on the panel 150, wherein the decoder may obtain the information about selected fingerprint zones according to a plurality of logic values of a second number m of start pulse signals S_1 to S_m. In the embodiment illustrated in FIG. 7A, the selected fingerprint zones may include the fingerprint zones SG_2 and SG_3.

In step S420, the chip (the fingerprint sensing control circuit 120) controls the panel 150 to perform fingerprint sensing, so as to obtain information about one (or more) selected fingerprint zones (e.g., the fingerprint zones SG_2 and SG_3) among the first number n of fingerprint zones SG_1 to SG_n of the panel 150. The chip (the fingerprint sensing control circuit 120), in step S420, may further provide a plurality of control signals to the panel 150 for controlling the panel 150 to perform the fingerprint sensing. The control signals include the second number m of start pulse signals S_1 to S_m, and the start pulse signals S_1 to S_m collectively indicate the selected fingerprint zones SG_2 and SG_3. The first number n is greater than the second number m. The start pulse signals S_1 to S_m may be provided to the decoder 152 disposed on the panel 150 for the decoder 152 to obtain the information about the selected fingerprint zones SG_2 and SG_3 according to the logic values of the start pulse signals S_1 to S_m.

Figure 9:
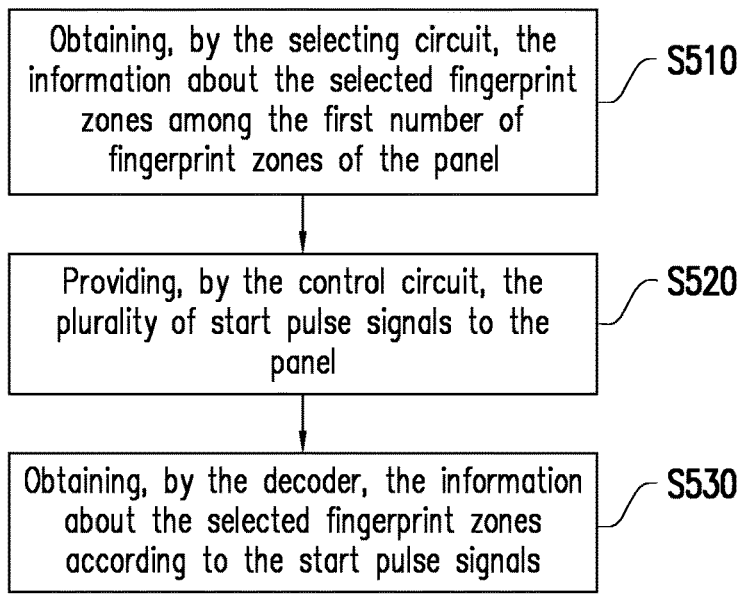
FIG. 9 is a flowchart illustrating an operation method according to another embodiment of the invention.

FIG. 9 is a flowchart illustrating an operation method according to another embodiment of the invention. Step S420 illustrated in FIG. 8 may be inferred with reference to the description related to FIG. 9. Referring to FIG. 1, FIG. 7A and FIG. 9, in step S510, the selecting circuit 122 may obtain the information about the selected fingerprint zones of the panel 150. In the embodiment illustrated in FIG. 7A, the selected fingerprint zones may include the fingerprint zones SG_2 and SG_3 encompassing the touched region 20. Namely, the fingerprint sensing control circuit 122 may select corresponding fingerprint zones (e.g., the fingerprint zones SG_2 and SG_3) from the fingerprint zones SG_1 to SG_n according to the touched region 20 and then, provide the information about the selected fingerprint zones SG_2 and SG_3 to the control circuit 124.

In step S520, the control circuit 124 may provide the control signals to the panel 150 for controlling the panel 150 to perform the fingerprint sensing. The control signals include a plurality of start pulse signals S_1 to S_m. Namely, the control circuit 124 may generate the corresponding start pulse signals S_1 to S_m according to the information about the selected fingerprint zones SG_2 and SG_3. Each of the start pulse signals S_1 to S_m has a respective logic state, and a logical state set of the start pulse signals S_1 to S_m and the selected fingerprint zones (e.g., the fingerprint zones SG_2 and SG_3) have a first mapping relationship therebetween. For example (but not limited to), the respective logic state of each of the start pulse signals S_1 to S_m may have a plurality of logic values. The selected fingerprint zones are indicated according to a mathematical formula of the logic values of the logic states of the start pulse signals S_1 to S_m.

The logic values and the mathematical formula may be determined based on a design requirement. For example, in some embodiments, the logic values includes 0 and 1, and the mathematical formula is $NF=\Sigma_{i=0}^{N_2-1} S\_(i+1)\cdot 2^i$. NF is an index number of the selected fingerprint zone (that is when the fingerprint zone SG_i is selected, NF=i), S_(i+1) also denotes a logic value of an $(i+1)^{th}$ start pulse signal S_(i+1), i is an integer from 0 to $N_2-1$, and $N_2$ is the second number m. In this embodiment, NF is expressed as a power of two. In other embodiments, NF can be any other number power, or there can be any functional relationship (or mapping relationship) between NF and the logical values of the pulse signals. As long as the total number of pulse signals (and related signal lines) provided by the IC to the panel can be reduced, it can be used according to design or application requirements.

For example, it is assumed that the first number n is 30, and the second number m is 5. The logical state set of the start pulse signals S_1 to S_5 and the selected fingerprint zone (denoted by the index number NF) among the fingerprint zones SG_1 to SG 30 have a first mapping relationship therebetween, and the first mapping relationship may be a mapping relationship defined by Table 1 below based on the formula $NF=\Sigma_{i=0}^{N_2-1} S\_(i+1)\cdot 2^i$. When the logic state set of the start pulse signals S_1 to S_5 is "00000", each of S_1-S_5 is 0, and therefore NF=0, so it means that there is no fingerprint zone that needs to be scanned. When the logic state set of the start pulse signals S_1 to S_5 is "00001", S_1-S_5 are 1, 0, 0, 0, and 0, respectively, and therefore NF=1, so it means that the first fingerprint zone SG_1 needs to be scanned. Other logical state sets of the start pulse signals S_1 to S_5 and the selected fingerprint zones can be analogized and omitted here for brevity.

The mapping relationship between input and output of the decoder 152 may be a mapping relationship defined by Table 2 below. When the logic state set of the start pulse signals S_1 to S_5 (input of the decoder 152) is "00000", the start pulse signals SP_1 to SP_30 (output of the decoder 152) are all 0. When the logic state set of the start pulse signals S_1 to S_5 is "00001", the start pulse signal SP_1 are 1 the rest of the start pulse signals SP_1 to SP_n are 0. Other logical state sets of the start pulse signals S_1 to S_5 and the start pulse signals SP_1 to SP_30 can be analogized and omitted here for brevity.

More specifically, when the logic state set of the start pulse signals SP_1 to SP_n is "100 . . . 0", the first fingerprint zone SG_1 needs to be scanned. When the logic state set of the start pulse signals SP_1 to SP_n is "010 . . . 0", the second fingerprint zone SG_2 needs to be scanned. Other logical state sets of the start pulse signals SP_1 to SP_n and the selected fingerprint zones can be analogized and omitted here for brevity.

Accordingly, only five wires are disposed between the fingerprint sensing control circuit 120 and the panel 150, and thereby, the start pulse signals SP_1 to SP_5 may be transmitted to the panel 150. In contrast, referring to the example illustrated in FIG. 6, thirty wires have to be disposed between the fingerprint sensing control circuit 120 and the panel 150 for transmitting the start pulse signals SP_1 to SP_30. Thus, the frame area of the panel 150 illustrated in FIG. 7A may be reduced since the total number of the wires coupled between the fingerprint sensing control circuit 120 and the panel 150 are reduced from 30 to 5.

TABLE 1 the mapping relationship between the start pulse signals S_1 to S_5 and the selected fingerprint zones (from SG_1 to SG_30)

| | Start pulse signal | | | | | |
|---|---|---|---|---|---|---|
| | S_5 | S_4 | S_3 | S_2 | S_1 | NF |
| No fingerprint zone | 0 | 0 | 0 | 0 | 0 | 0 |
| SG 1 | 0 | 0 | 0 | 0 | 1 | 1 |

TABLE 1-continued the mapping relationship between the start pulse signals S_1 to
S_5 and the selected fingerprint zones (from SG_1 to SG_30)

| | Start pulse signal | | | | | |
|---|---|---|---|---|---|---|
| | S_5 | S_4 | S_3 | S_2 | S_1 | NF |
| SG 2 | 0 | 0 | 0 | 1 | 0 | 2 |
| SG 3 | 0 | 0 | 0 | 1 | 1 | 3 |
| SG 4 | 0 | 0 | 1 | 0 | 0 | 4 |
| SG 5 | 0 | 0 | 1 | 0 | 1 | 5 |
| SG 6 | 0 | 0 | 1 | 1 | 0 | 6 |
| SG 7 | 0 | 0 | 1 | 1 | 1 | 7 |
| SG 8 | 0 | 1 | 0 | 0 | 0 | 8 |
| SG 9 | 0 | 1 | 0 | 0 | 1 | 9 |
| SG 10 | 0 | 1 | 0 | 1 | 0 | 10 |
| SG 11 | 0 | 1 | 0 | 1 | 1 | 11 |
| SG 12 | 0 | 1 | 1 | 0 | 0 | 12 |
| SG 13 | 0 | 1 | 1 | 0 | 1 | 13 |
| SG 14 | 0 | 1 | 1 | 1 | 0 | 14 |
| SG 15 | 0 | 1 | 1 | 1 | 1 | 15 |
| SG 16 | 1 | 0 | 0 | 0 | 0 | 16 |
| SG 17 | 1 | 0 | 0 | 0 | 1 | 17 |
| SG 18 | 1 | 0 | 0 | 1 | 0 | 18 |
| SG 19 | 1 | 0 | 0 | 1 | 1 | 19 |
| SG 20 | 1 | 0 | 1 | 0 | 0 | 20 |
| SG 21 | 1 | 0 | 1 | 0 | 1 | 21 |
| SG 22 | 1 | 0 | 1 | 1 | 0 | 22 |
| SG 23 | 1 | 0 | 1 | 1 | 1 | 23 |
| SG 24 | 1 | 1 | 0 | 0 | 0 | 24 |
| SG 25 | 1 | 1 | 0 | 0 | 1 | 25 |
| SG 26 | 1 | 1 | 0 | 1 | 0 | 26 |
| SG 27 | 1 | 1 | 0 | 1 | 1 | 27 |
| SG 28 | 1 | 1 | 1 | 0 | 0 | 28 |
| SG 29 | 1 | 1 | 1 | 0 | 1 | 29 |
| SG 30 | 1 | 1 | 1 | 1 | 0 | 30 |

TABLE 2 the mapping relationship between the start pulse signals
S_1 to S_5 and the start pulse signals SP_1 to SP_30

| Input | | | | | Output |
|---|---|---|---|---|---|
| S_5 | S_4 | S_3 | S_2 | S_1 | SP_1 to SP_30 |
| 0 | 0 | 0 | 0 | 0 | SP_1 to SP_30 are all 0 |
| 0 | 0 | 0 | 0 | 1 | SP_1 = 1, the rest are 0 |
| 0 | 0 | 0 | 1 | 0 | SP_2 = 1, the rest are 0 |
| 0 | 0 | 0 | 1 | 1 | SP_3 = 1, the rest are 0 |
| 0 | 0 | 1 | 0 | 0 | SP_4 = 1, the rest are 0 |
| 0 | 0 | 1 | 0 | 1 | SP_5 = 1, the rest are 0 |
| 0 | 0 | 1 | 1 | 0 | SP_6 = 1, the rest are 0 |
| 0 | 0 | 1 | 1 | 1 | SP_7 = 1, the rest are 0 |
| 0 | 1 | 0 | 0 | 0 | SP_8 = 1, the rest are 0 |
| 0 | 1 | 0 | 0 | 1 | SP_9 = 1, the rest are 0 |
| 0 | 1 | 0 | 1 | 0 | SP_10 = 1, the rest are 0 |
| 0 | 1 | 0 | 1 | 1 | SP_11 = 1, the rest are 0 |
| 0 | 1 | 1 | 0 | 0 | SP_12 = 1, the rest are 0 |
| 0 | 1 | 1 | 0 | 1 | SP_13 = 1, the rest are 0 |
| 0 | 1 | 1 | 1 | 0 | SP_14 = 1, the rest are 0 |
| 0 | 1 | 1 | 1 | 1 | SP_15 = 1, the rest are 0 |
| 1 | 0 | 0 | 0 | 0 | SP_16 = 1, the rest are 0 |
| 1 | 0 | 0 | 0 | 1 | SP_17 = 1, the rest are 0 |
| 1 | 0 | 0 | 1 | 0 | SP_18 = 1, the rest are 0 |
| 1 | 0 | 0 | 1 | 1 | SP_19 = 1, the rest are 0 |
| 1 | 0 | 1 | 0 | 0 | SP_20 = 1, the rest are 0 |
| 1 | 0 | 1 | 0 | 1 | SP_21 = 1, the rest are 0 |
| 1 | 0 | 1 | 1 | 0 | SP_22 = 1, the rest are 0 |
| 1 | 0 | 1 | 1 | 1 | SP_23 = 1, the rest are 0 |
| 1 | 1 | 0 | 0 | 0 | SP_24 = 1, the rest are 0 |
| 1 | 1 | 0 | 0 | 1 | SP_25 = 1, the rest are 0 |
| 1 | 1 | 0 | 1 | 0 | SP_26 = 1, the rest are 0 |
| 1 | 1 | 0 | 1 | 1 | SP_27 = 1, the rest are 0 |
| 1 | 1 | 1 | 0 | 0 | SP_28 = 1, the rest are 0 |
| 1 | 1 | 1 | 0 | 1 | SP_29 = 1, the rest are 0 |
| 1 | 1 | 1 | 1 | 0 | SP_30 = 1, the rest are 0 |

Referring to FIG. 1, FIG. 7A and FIG. 9, the start pulse signals S_1 to S_m are used to be provided to the decoder 152 disposed on the panel 150. In step S530, the decoder 152 may obtain the information about the selected fingerprint zones (e.g., the fingerprint zones SG_2 and SG_3) according to the logic values of the start pulse signals S_1 to S_m. Thus, the start pulse signals S_1 to S_m may collectively indicate the selected fingerprint zones SG_2 and SG_3. For example, taking Table 1 as an example for explanation, when the start pulse signals S_1 to S_5 are "00010", the fingerprint zone SG_2 is the selected fingerprint zone, and thus, the decoder 152 applies a pulse to the start pulse signal SP_2 and does not apply the pulse to the other start pulse signals SP_1 and SP_3 to SP_30. When the start pulse signals S_1 to S_5 are "00011", the fingerprint zone SG_3 is the selected fingerprint zone, and thus, the decoder 152 applies a pulse to the start pulse signal SP_3 and does not apply the pulse to the other start pulse signals SP_1, SP_2 and SP_4 to SP_30.

Figure 10:
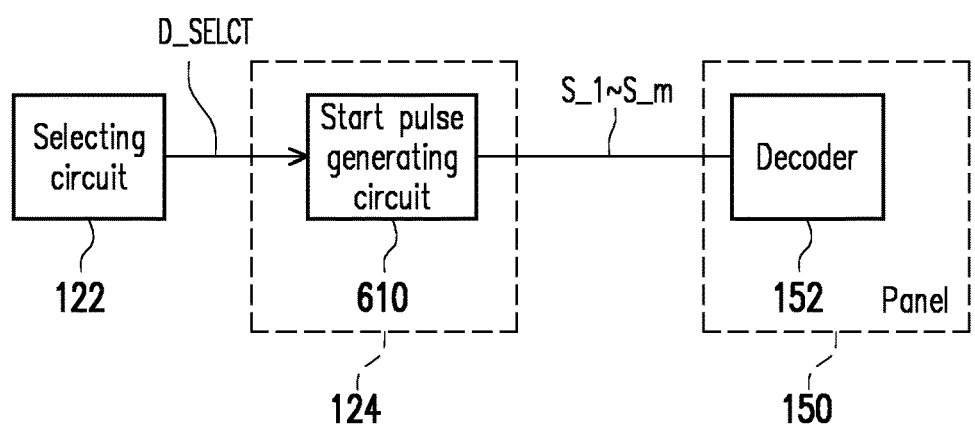
FIG. 10 is a schematic circuit block diagram illustrating the control circuit depicted in FIG. 7A according to an embodiment of the invention.

FIG. 10 is a schematic circuit block diagram illustrating the control circuit 124 depicted in FIG. 7A according to an embodiment of the invention. In the embodiment illustrated in FIG. 10, the control circuit 124 includes a start pulse generating circuit 610 (e.g., an encoder, encoding circuit or any other conversion circuits available to implement the function). The start pulse generating circuit 610 can convert the selected area information D_SELCT in digital form into the start pulse signals S_1 to S_m. The start pulse generating circuit 610 may provide the start pulse signals S_1 to S_m to the decoder 152 of the panel 150 according to the information about the selected fingerprint zones (e.g., the fingerprint zones SG_2 and SG_3). The implementation details of the start pulse generating circuit 610 (the start pulse generating circuit) are not limited in the present embodiment. For example, in some embodiments, the start pulse generating circuit 610 may include a binary start pulse generating circuit.

The fingerprint sensing control circuit 122 may select corresponding fingerprint zones (e.g., the fingerprint zones SG_2 and SG_3) from the fingerprint zones SG_1 to SG_n according to the touched region 20 and then, provide the information about the selected fingerprint zones SG_2 and SG_3 to the start pulse generating circuit 610 (the start pulse generating circuit). The start pulse generating circuit 610 may generate the corresponding start pulse signals S_1 to S_m according to the information about the selected fingerprint zones SG_2 and SG_3. For example, the start pulse generating circuit 610 (the start pulse generating circuit) may encode or convert an index number of the selected fingerprint zones as the logic values of the start pulse signals S_1 to S_m. The logical state set of the start pulse signals S_1 to S_m and the selected fingerprint zone from the fingerprint zones SG_1 to SG_n have a first mapping relationship therebetween. Based on a design requirement, the first mapping relationship may be a mapping relationship defined by Table 1 or other mapping relationships.

It should be noted that the control circuit 124 illustrated in FIG. 10 is an example of various implementation manners. The specific implementation manner of the control circuit 124 illustrated in FIG. 7A may be determined based on a design requirement. In some other embodiments, the control circuit 124 may provide different numbers of start pulse signals under different settings (operation modes). For example, when the fingerprint sensing control circuit 120 is applied to a panel 150 configured with a decoder 152 (i.e., the panel 150 illustrated in FIG. 7A), the control circuit 124 may be operated in a first operation mode to provide m start pulse signals S_1 to S_m to the decoder 152 of the panel 150 illustrated in FIG. 7A. When the fingerprint sensing control circuit 120 is applied to a panel without a decoder 152 (i.e., the panel 150 illustrated in FIG. 6), the control circuit 124 may be operated in a second operation mode to provide n start pulse signals SP_1 to SP_n to the shift register groups SR_1 to SR_n of the panel 150 illustrated in FIG. 6. n is greater than m.

Figure 11:
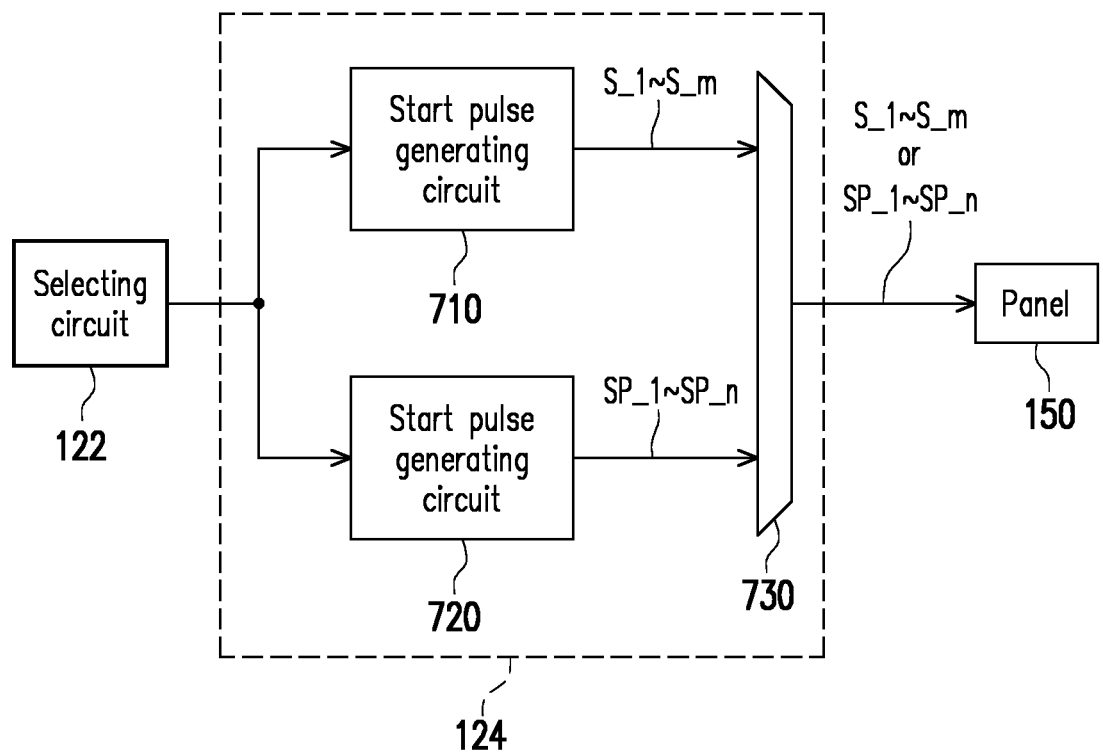
FIG. 11 is a schematic circuit block diagram illustrating the control circuit depicted in FIG. 7A according to another embodiment of the invention.

FIG. 11 is a schematic circuit block diagram illustrating the control circuit 124 depicted in FIG. 7A according to another embodiment of the invention. In the embodiment illustrated in FIG. 11, the control circuit 124 includes a start pulse generating circuit 710, a start pulse generating circuit 720 and a switching circuit 730. The start pulse generating circuit 710 illustrated in FIG. 11 may be inferred with reference to the description related to the start pulse generating circuit 610 illustrated in FIG. 10 and thus, will not be repeatedly described. In some embodiments, the start pulse generating circuit 710 may include a binary start pulse generating circuit. The start pulse generating circuit 710 may generate corresponding start pulse signals S_1 to S_m according to information about selected fingerprint zones which is provided by the selecting circuit 122 to the switching circuit 730. The start pulse signals S_1 to S_m are used to be provided to the decoder 152 disposed on the panel 150 for the decoder 152 to obtain the information about the selected fingerprint zones according to the logic values of the start pulse signals S_1 to S_m.

According to the information about the selected fingerprint zones which is provided by the selecting circuit 122, the start pulse generating circuit 720 may provide a third number of start pulse signals, wherein the third number is not equal to the second number m. For example, the first start pulse generating circuit 720 may provide n start pulse signals SP_1 to SP_n to the switching circuit 730 (i.e., the third number is equal to the first number n). The implementation details of the start pulse generating circuit 720 are not limited in the present embodiment. For example, in some embodiments, the start pulse generating circuit 720 may include a thermometer-code start pulse generating circuit or an one-hot code pulse generating circuit.

The switching circuit 730 is coupled to the start pulse generating circuits 710 and 720. According to the type of the panel (for example, whether the panel has a decoder), the switching circuit 730 may select the start pulse signals S_1 to S_m of the start pulse generating circuit 710 or the start pulse signals SP_1 to SP_n of the start pulse generating circuit 720 as the control signals and output the control signals to the panel 150. A logical state set of the start pulse signals S_1 to S_m and the selected fingerprint zones have a first mapping relationship therebetween, and a logical state set of the start pulse signals SP_1 to SP_n and the selected fingerprint zones have a second mapping relationship therebetween. The first mapping relationship is different from the second mapping relationship.

Figure 12:
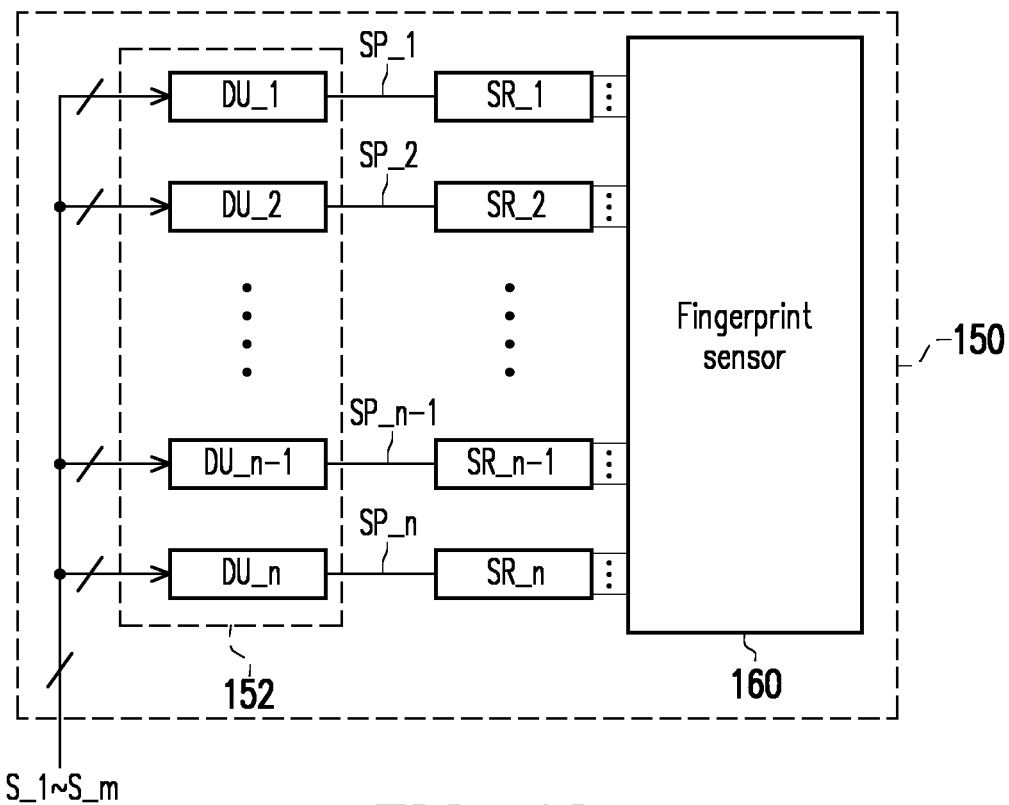
FIG. 12 is a schematic circuit block diagram illustrating the decoder depicted in FIG. 7A according to an embodiment of the invention.

FIG. 12 is a schematic circuit block diagram illustrating the decoder 152 depicted in FIG. 7A according to an embodiment of the invention. In the embodiment illustrated in FIG. 12, the decoder 152 includes decoder units DU_1, DU_2, . . . , DU_n-1 and DU_n. Each of the decoder units DU_1 to DU_n corresponds one of the fingerprint zones SG_1 to SG_n. All of the start pulse signals S_1 to S_m are provided to each of the decoder units DU_1 to DU_n. Input terminals of each of the decoder units DU_1 to DU_n can be coupled to the control circuit 124 to receive all of the start pulse signals S_1 to S_m. Each of the decoder units DU_1 to DU_n can be configured to decode the start pulse signals S_1 to S_m to obtain a corresponding one of the start pulse signals SP_1 to SP_n. Output terminals of the decoder units DU_1 to DU_n are coupled to the shift register groups SR_1 to SR_n to provide the start pulse signals SP_1 to SP_n. For example, the decoder unit DU_1 may provide the start pulse signal SP_1 to the shift register group SR_1, the decoder unit DU_2 may provide the start pulse signal SP_2 to the shift register group SR_2, the decoder unit DU_n-1 may provide the start pulse signal SP_n-1 to the shift register group SR_n-1, and the decoder unit DU_n may provide the start pulse signal SP_n to the shift register group SR_n.

The decoder units DU_1 to DU_n may have identical circuit structures. The input terminals of the decoder units DU_1 to DU_n can have different coupling relationships with the start pulse signals S_1 to S_m. Each of the decoder units DU_1 to DU_n is configured to decode the start pulse signals S_1 to S_m to a corresponding one of the start pulse signals SP_1 to SP_n. Each of the start pulse signals SP_1 to SP_n can correspond to one of the fingerprint zones SG_1 to SG_n. Each of the start pulse signals SP_1 to SP_n is provided to a corresponding one of the shift register groups SR_1 to SR_n. Each of the start pulse signals SP_1 to SP_n is used by one of the shift register groups SR_1 to SR_n (the GOA circuit) to generate a plurality of scan signals (e.g., the scan signals FPR_GL1_SEL/WRITE and/or FPR_GL2_SEL/WRITE illustrated in FIG. 7B) for controlling the gate lines (e.g., the gate lines FPR_GL1 to FPR_GL2 illustrated in FIG. 7A) coupled to the fingerprint sensing pixels of the panel 150.

For example, FIG. 13 through FIG. 26 are schematic circuit block diagrams illustrating the decoder units DU_1 to DU_n depicted in FIG. 12 according to different embodiments of the invention. In the exemplary embodiments illustrated in FIG. 13 through FIG. 26, the first number n is assumed to be 31, and the second number m is assumed to be 5. Namely, the decoder 152 includes decoder units DU_1. DU_2 . . . and DU_31. The control circuit 124 can provide start pulse signals S_1 to S_5 to the decoder units DU_1 to DU_31. Output terminals of the decoder units DU_1 to DU_31 can be coupled to the shift register groups to provide the start pulse signals SP_1 to SP31. For example, the decoder unit DU_1 may provide the start pulse signal SP_1, the decoder unit DU_2 may provide the start pulse signal SP_2, the decoder unit DU_3 may provide the start pulse signal SP_3, and the decoder unit DU_31 may provide the start pulse signal SP_31.

Figure 13:
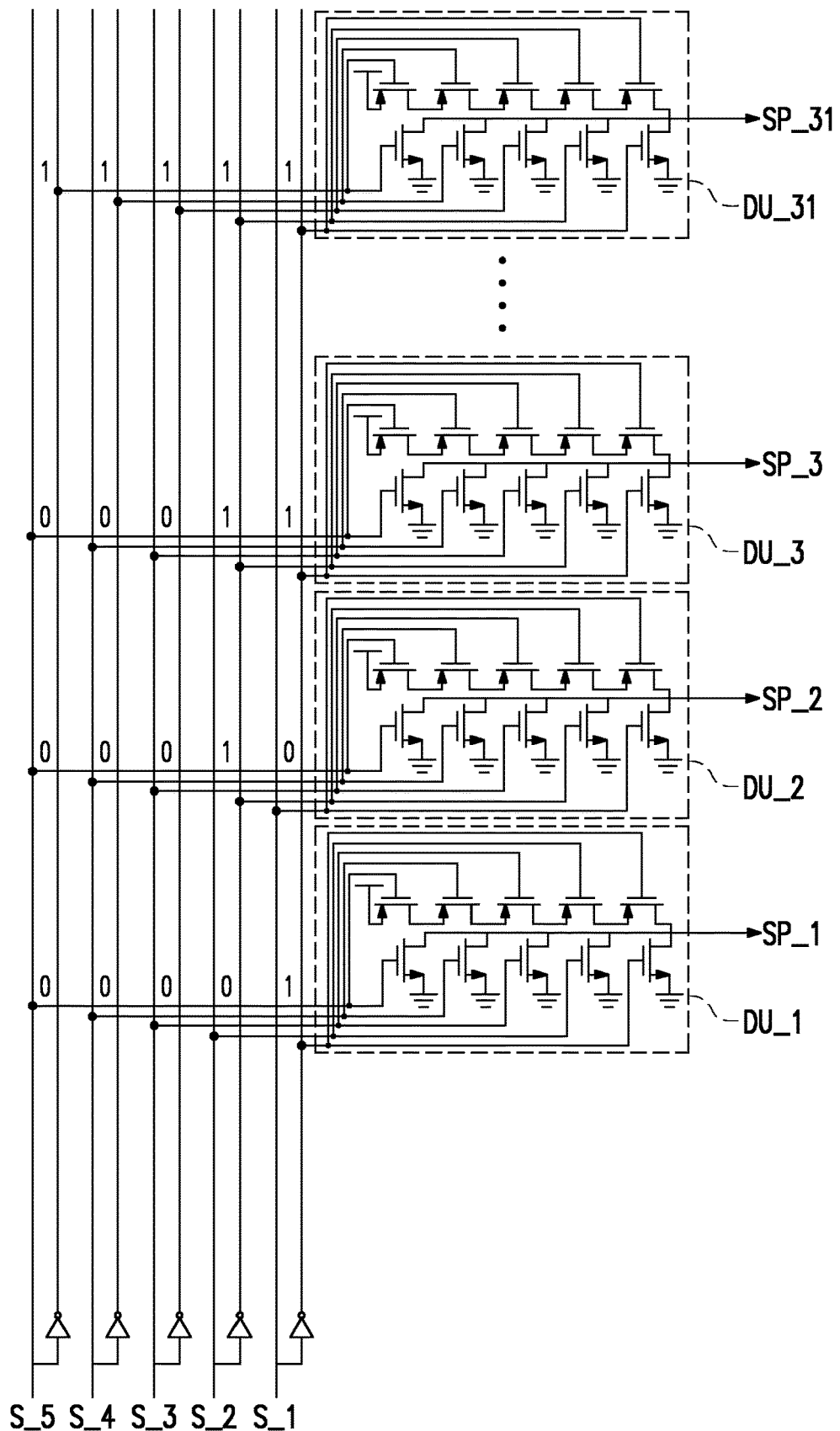
FIG. 13 through FIG. 26 are schematic circuit block diagrams illustrating the decoder depicted in FIG. 12 according to different embodiments of the invention.

In the exemplary embodiment illustrated in FIG. 13, each of the decoder units DU_1 to DU_31 includes a plurality of input terminals, an output terminal and a plurality of first logic units. Here, the decoder unit DU_1 will be used as an example. Other decoder units DU_2 to DU_31 illustrated in FIG. 13 may be inferred with reference to the descriptions related to the decoder unit DU_1 illustrated in FIG. 13 and thus, will not be repeatedly described. The decoder unit DU_1 includes a plurality of input terminals configured to be coupled to the start pulse signals S_1 to S_5. This means that the input terminals may receive the start pulse signals S_1 to S_5 (or the inverted signal of the start pulse signals S_1 to S_5) respectively. The decoder unit DU_1 includes an output terminal configured to provide a corresponding one of the start pulse signals SIM to SP31 (i.e. the start pulse signals SP_1). The decoder unit DU_1 includes a plurality of first logic units, e.g. the p-channel metal oxide semiconductor (PMOS) transistors illustrated in FIG. 13. A total number of the first logic units can be the same as a total number of the start pulse signals S_1 to S_5.

Each of the first logic units includes an input terminal coupled to the input terminals of the decoder unit DU_1. In the exemplary embodiment illustrated in FIG. 13, the first logic units are connected in cascade, and a specific one of the first logic units has an output terminal coupled to the output terminal of the decoder unit DU_1. For example, each of the PMOS transistors includes a gate terminal coupled to the input terminals of the decoder unit DU_1. The PMOS transistors in the decoder unit DU_1 are connected in cascade, and a specific one. i.e., a rightmost one of the PMOS transistors has an output terminal coupled to the output terminal of the decoder unit DU_1.

In the exemplar embodiment illustrated in FIG. 13, the decoder unit DU_1 further includes a plurality of second logic units, e.g. the n-channel metal oxide semiconductor (NMOS) transistors illustrated in FIG. 13. Each of the second logic units comprises an input terminal (e.g. a gate terminal) coupled to a corresponding one of the start pulse signals S_1 to S_5 (or the inverted signal of the start pulse signals S_1 to S_5). A total number of the second logic units can be same as a total number of the start pulse signals S_1 to S_5. All output terminals of the second logic units of the decoder unit DU_1 (e.g. all drain terminals of the NMOS transistors in the decoder unit DU_1) are coupled together to the output terminal of the decoder unit DU_1.

Figure 14:
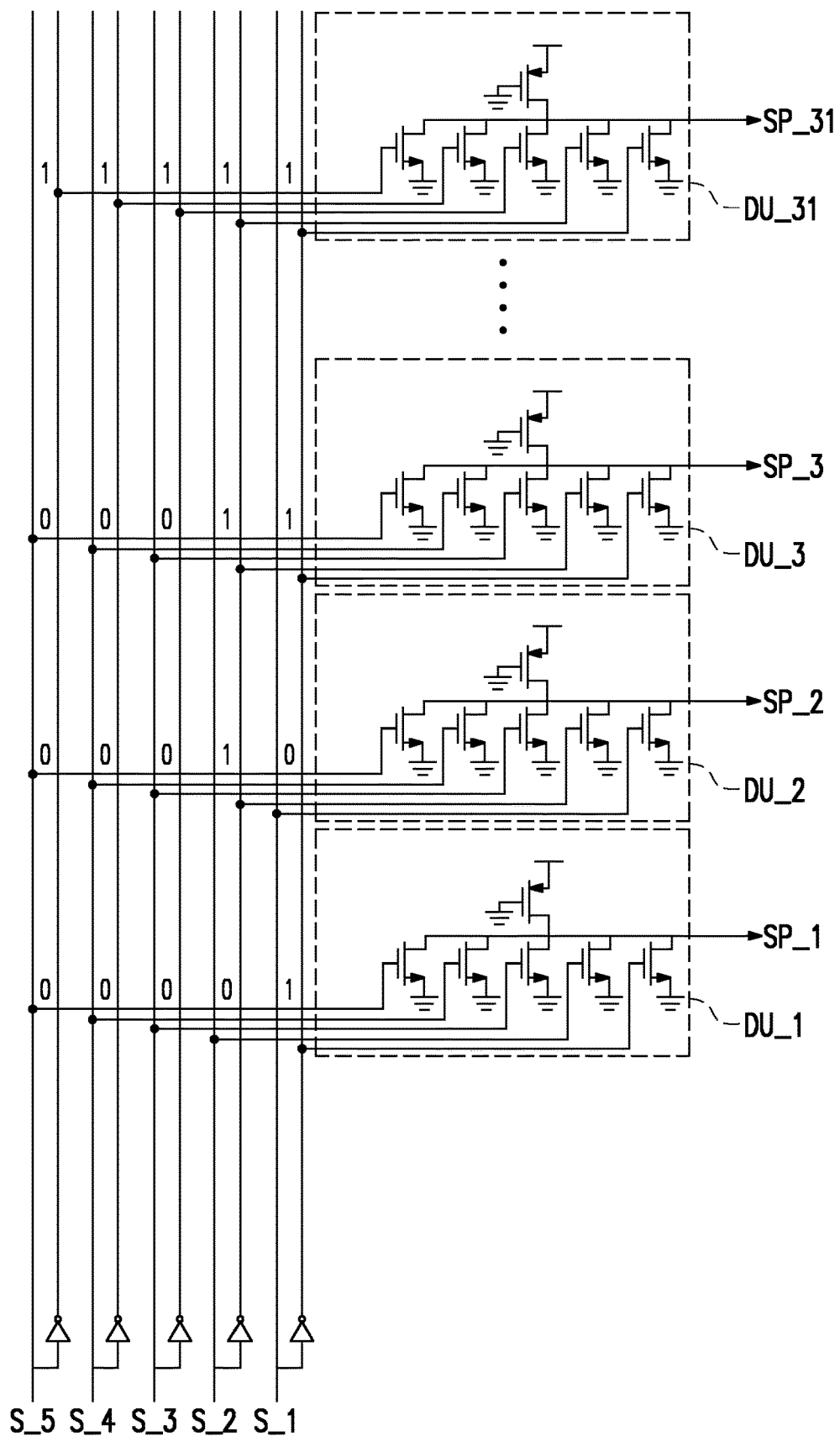

In the exemplar embodiment illustrated in FIG. 14, each of the decoder units DU_1 to DU_31 includes a plurality of input terminals, an output terminal and a plurality of first logic units. The decoder units DU_1 to DU_31 illustrated in FIG. 14 may be inferred with reference to the descriptions related to those illustrated in FIG. 13 and thus, will not be repeatedly described. In the exemplar embodiment illustrated in FIG. 14, the first logic units can be the NMOS transistors in the decoder unit DU_1. Each of the first logic units comprises an input terminal (e.g. a gate terminal) coupled to a corresponding one of the start pulse signals S_1 to S_5. This means that each of the input terminals may receive a corresponding one of the start pulse signals S_1 to S_5 (or the inverted signal of the start pulse signals S_1 to S_5). All output terminals of the first logic units of the decoder unit DU_1 (e.g. all drain terminals of the NMOS transistors in the decoder unit DU_1) are coupled together to the output terminal of the decoder unit DU_1. In the exemplar embodiment illustrated in FIG. 14, the decoder unit DU_1 further includes a PMOS transistor coupled to the NMOS transistors and the output terminal of the decoder unit DU_1.

Figure 15:
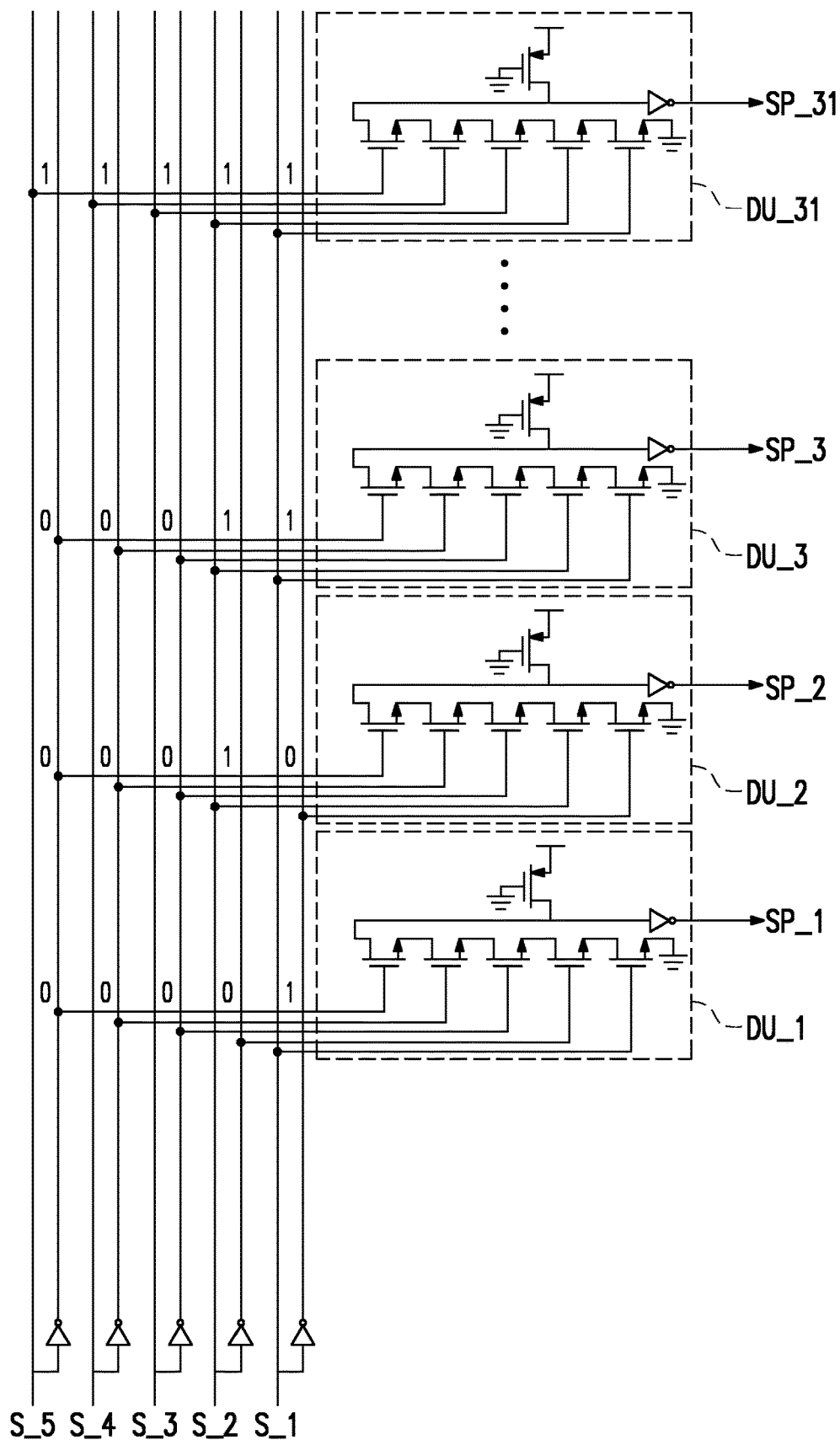

In the exemplar embodiment illustrated in FIG. 15, each of the decoder units DU_1 to DU_31 includes a plurality of input terminals, an output terminal and a plurality of first logic units. The decoder units DU_1 to DU_31 illustrated in FIG. 15 may be inferred with reference to the descriptions related to those illustrated in FIG. 13 and thus, will not be repeatedly described. In the exemplary embodiment illustrated in FIG. 15, the first logic units can be the NMOS transistors in the decoder unit DU_1. Each of the first logic units comprises an input terminal (e.g. a gate terminal) coupled to a corresponding one of the start pulse signals S_1 to S_5. This means that the input terminal can receive a corresponding one of the start pulse signals S_1 to S_5 (or the inverted signal of the start pulse signals S_1 to S_5). The first logic units are connected in cascade. For example, the NMOS transistors in the decoder unit DU_1 are connected in cascade.

In the exemplary embodiment illustrated in FIG. 15, the decoder unit DU_1 further includes a PMOS transistor in the decoder unit DU_1. The PMOS transistor in the decoder unit DU_1 is coupled to the output terminal (e.g. drain terminal) of a specific one of the NMOS transistors in the decoder unit DU_1. In the exemplary embodiment illustrated in FIG. 15, the decoder unit DU_1 further includes an inverter coupled between the output terminal of the specific one of NMOS transistors (the first logic units) and the output terminal of the decoder unit DU_1.

Figure 16:
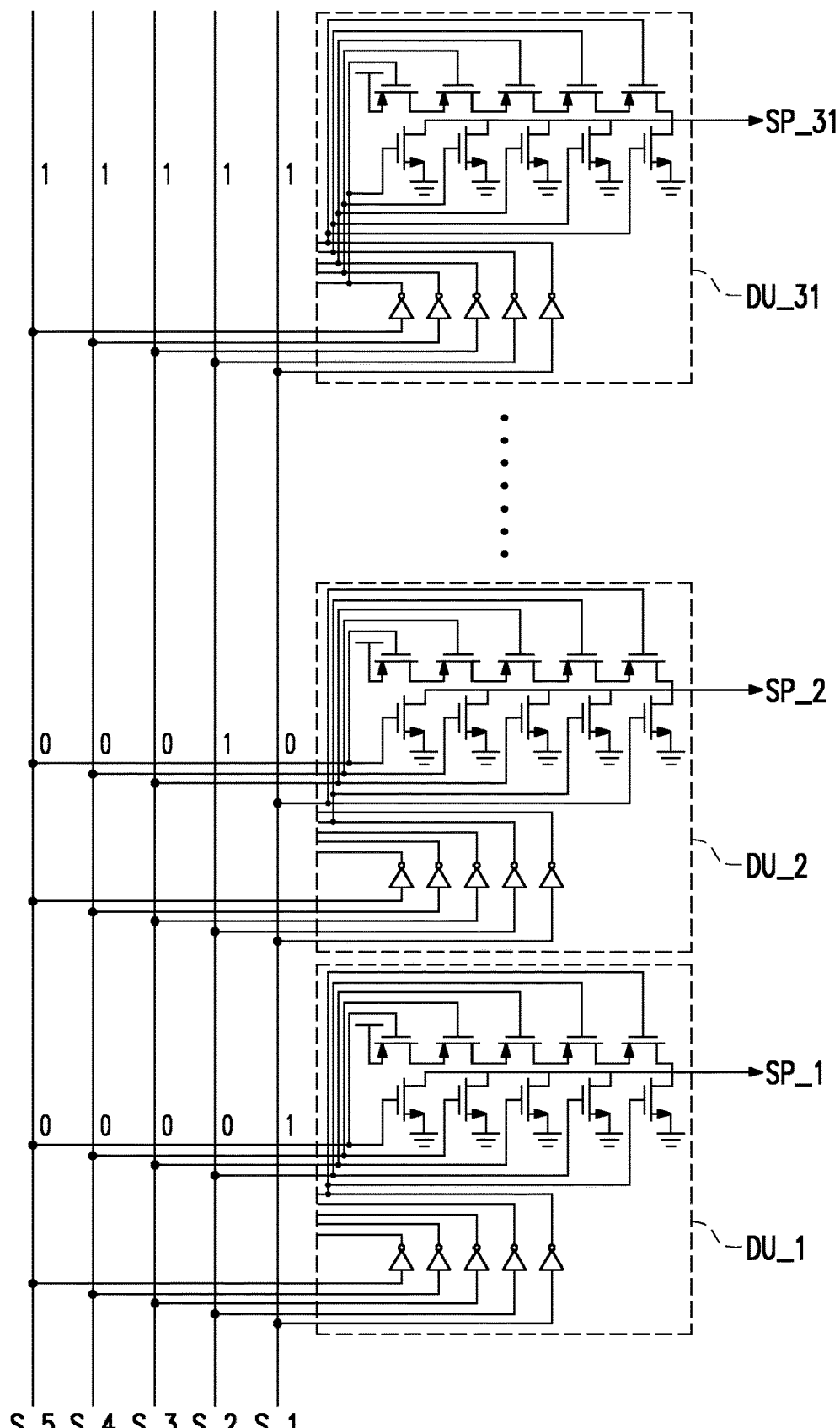

In the exemplary embodiment illustrated in FIG. 16, each of the decoder units DU_1 to DU_31 includes a plurality of input terminals, an output terminal, a plurality of first logic units and a plurality of second logic units. In the exemplary embodiment illustrated in FIG. 16, the first logic units can be the PMOS transistors in each of the decoder units DU_1 to DU_31, and the second logic units can be the NMOS transistors in each of the decoder units DU_1 to DU_31. The decoder units DU_1 to DU_31 illustrated in FIG. 16 may be inferred with reference to the descriptions related to those illustrated in FIG. 13 and thus, will not be repeatedly described.

In the exemplary embodiment illustrated in FIG. 16, each of the decoder units DU_1 to DU_31 further comprises a plurality of inverters. Here, the decoder unit DU_1 will be used as an example. Other decoder units DU_2 to DU_31 illustrated in FIG. 16 may be inferred with reference to the descriptions related to the decoder unit DU_1 illustrated in FIG. 16 and thus, will not be repeatedly described. Each of the inverters in the decoder unit DU_1 is coupled between one of the input terminals of the decoder unit DU_1 and the input terminal of one of the first logic units. The inverter illustrated in FIG. 16 whose input terminal is floating can be omitted according to design requirements.

Figure 17:
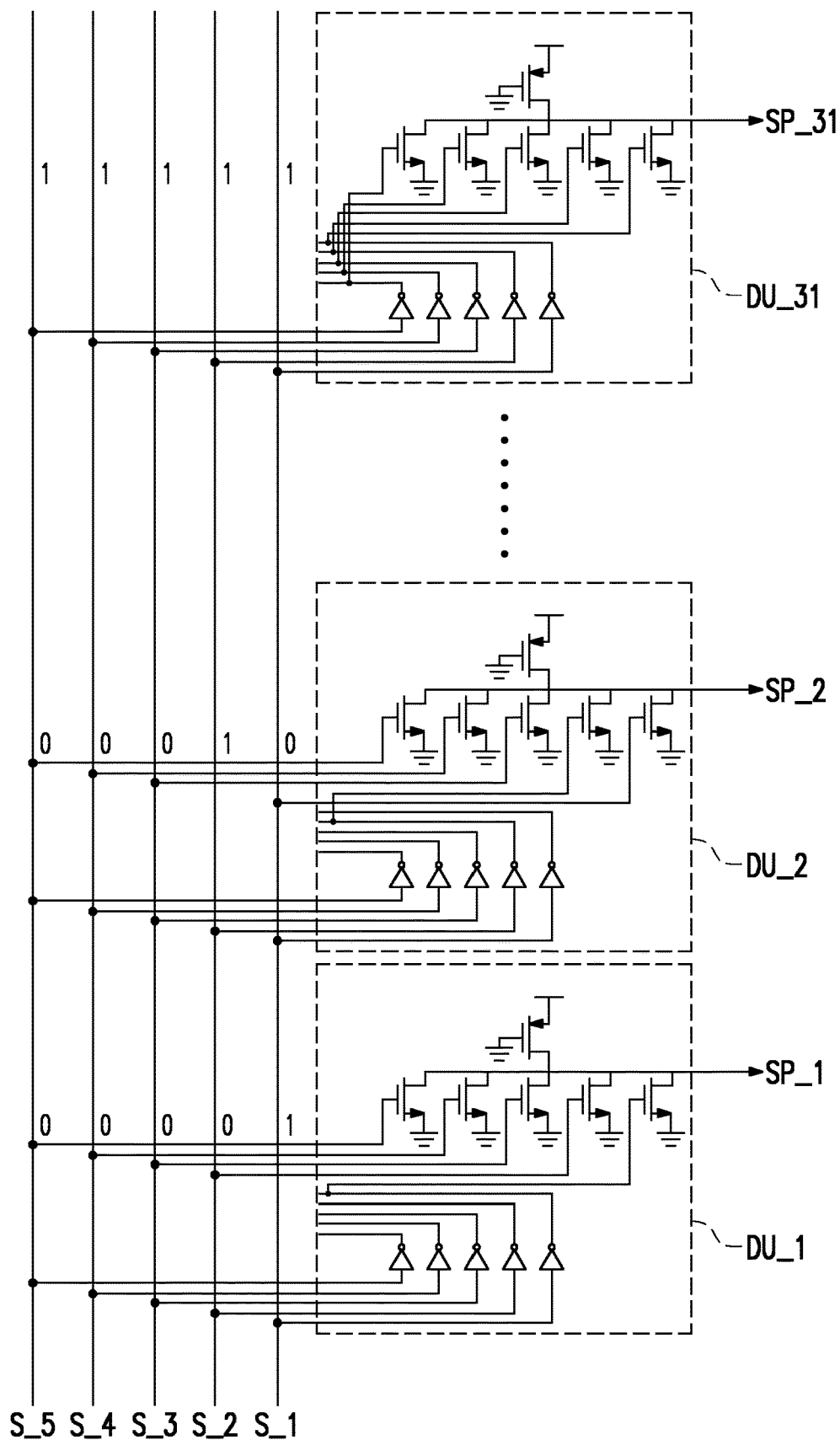

In the exemplary embodiment illustrated in FIG. 17, each of the decoder units DU_1 to DU_31 includes a plurality of input terminals, an output terminal, and a plurality of first logic units. In the exemplary embodiment illustrated in FIG. 17, the first logic units can be the NMOS transistors in each of the decoder units DU_1 to DU_31, and each of the decoder units DU_1 to DU_31 can further include a PMOS transistor in each of the decoder units DU_1 to DU_31. The decoder units DU_1 to DU_31 illustrated in FIG. 17 may be inferred with reference to the descriptions related to those illustrated in FIG. 14 and thus, will not be repeatedly described.

In the exemplary embodiment illustrated in FIG. 17, each of the decoder units DU_1 to DU_31 further comprises a plurality of inverters. The inverters in each of the decoder units DU_1 to DU_31 may be inferred with reference to the descriptions related to those illustrated in FIG. 16 and thus, will not be repeatedly described.

Figure 18:
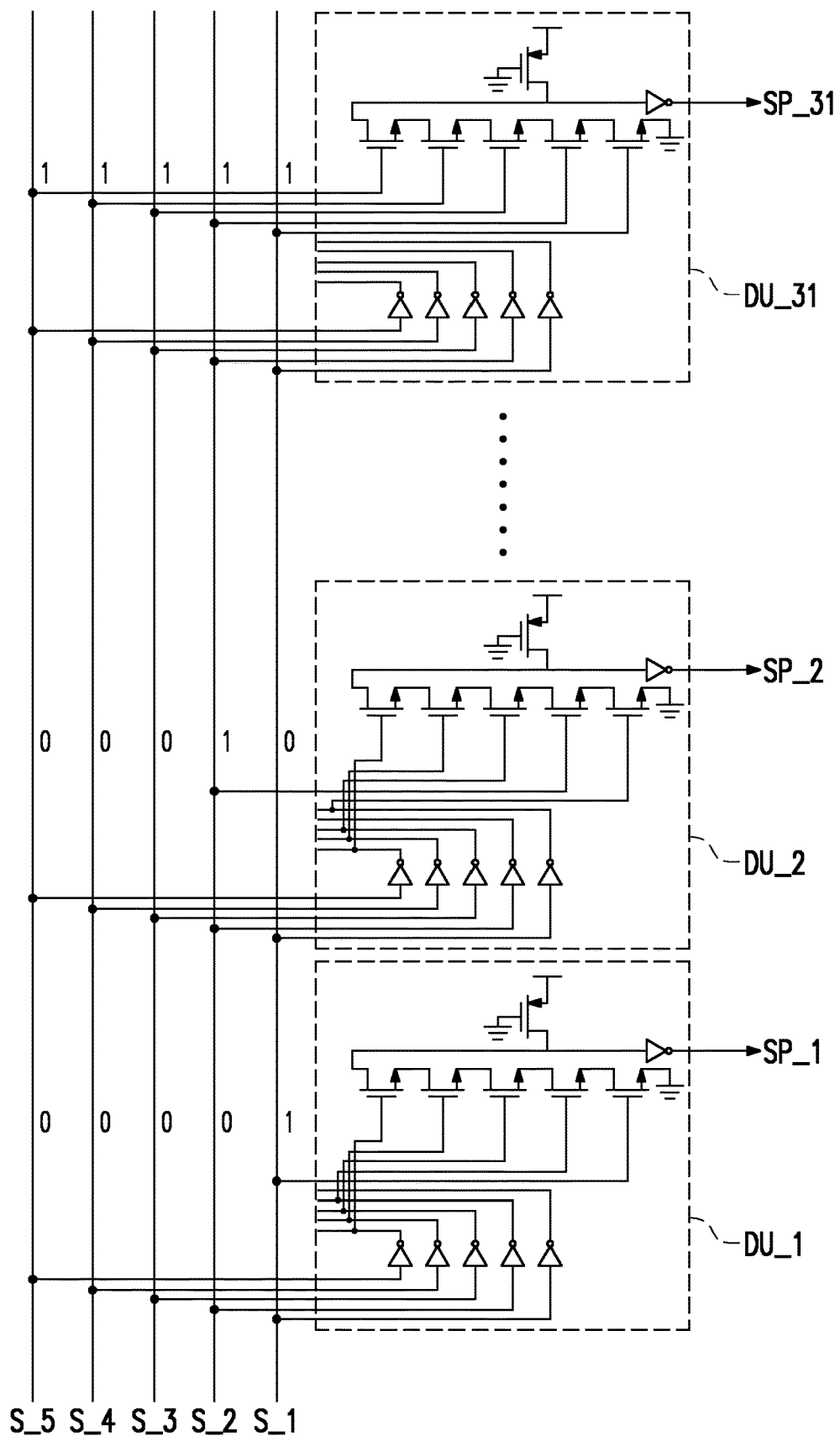

In the exemplary embodiment illustrated in FIG. 18, each of the decoder units DU_1 to DU_31 includes a plurality of input terminals, an output terminal, and a plurality of first logic units. In the exemplary embodiment illustrated in FIG. 18, the first logic units can be the NMOS transistors in each of the decoder units DU_1 to DU_31, and each of the decoder units DU_1 to DU_31 can further include a PMOS transistor and an inverter coupled thereto. The decoder units DU_1 to DU_31 illustrated in FIG. 18 may be inferred with reference to the descriptions related to those illustrated in FIG. 15 and thus, will not be repeatedly described.

In the exemplary embodiment illustrated in FIG. 18, each of the decoder units DU_1 to DU_31 further comprises a plurality of inverters. The inverters in each of the decoder units DU_1 to DU_31 may be inferred with reference to the descriptions related to those illustrated in FIG. 16 and thus, will not be repeatedly described.

Figure 19:
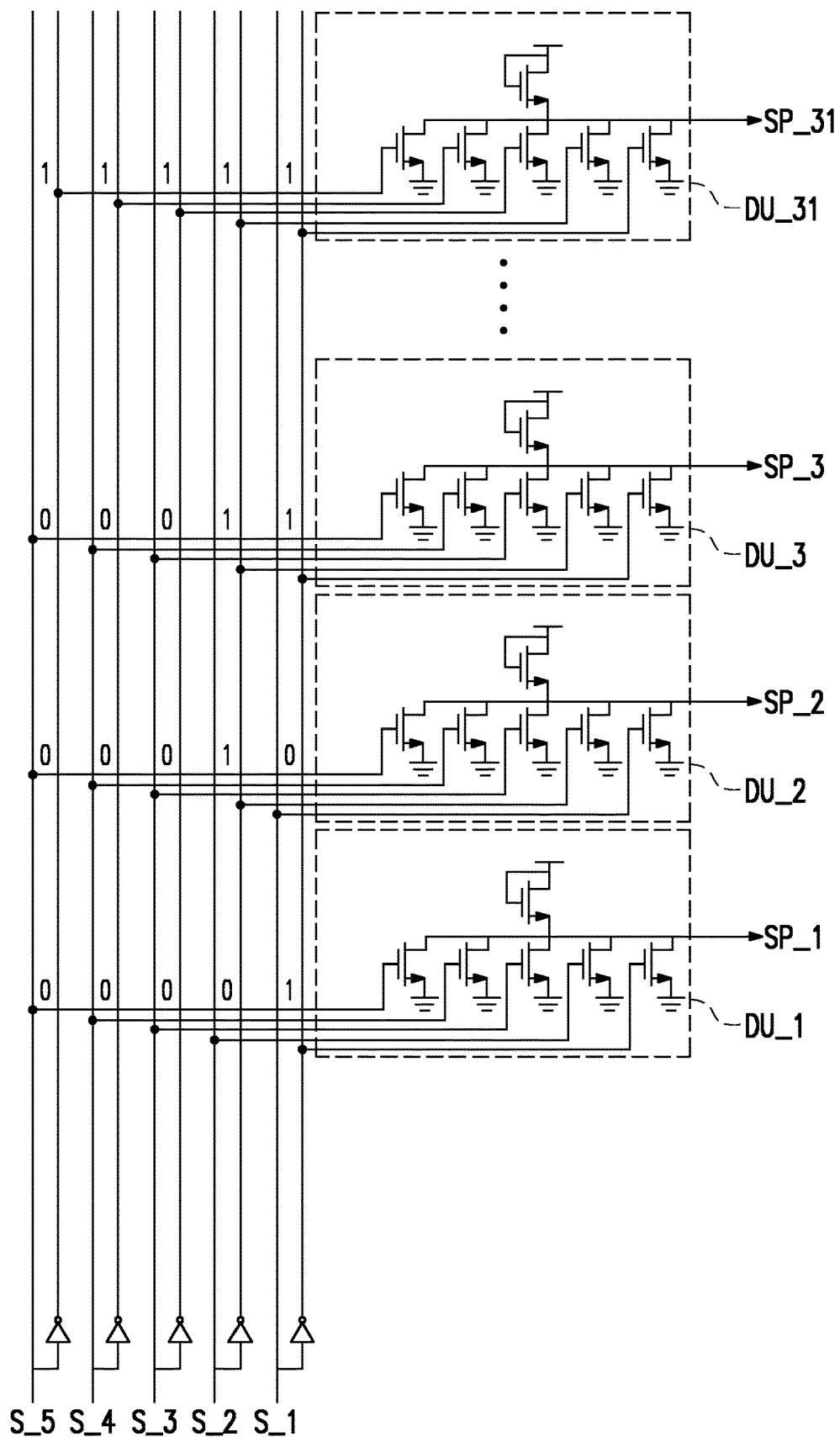

In the exemplary embodiment illustrated in FIG. 19, each of the decoder units DU_1 to DU_31 includes a plurality of input terminals, an output terminal, and a plurality of first logic units. In the exemplary embodiment illustrated in FIG. 19, the first logic units can be the NMOS transistors in each of the decoder units DU_1 to DU_31. The decoder units DU_1 to DU_31 illustrated in FIG. 19 may be inferred with reference to the descriptions related to those illustrated in FIG. 14 and thus, will not be repeatedly described. In the exemplary embodiment illustrated in FIG. 19, the PMOS transistor in FIG. 14 is replaced with the diode-connected NMOS transistor in each of the decoder units DU_1 to DU_31.

Figure 20:
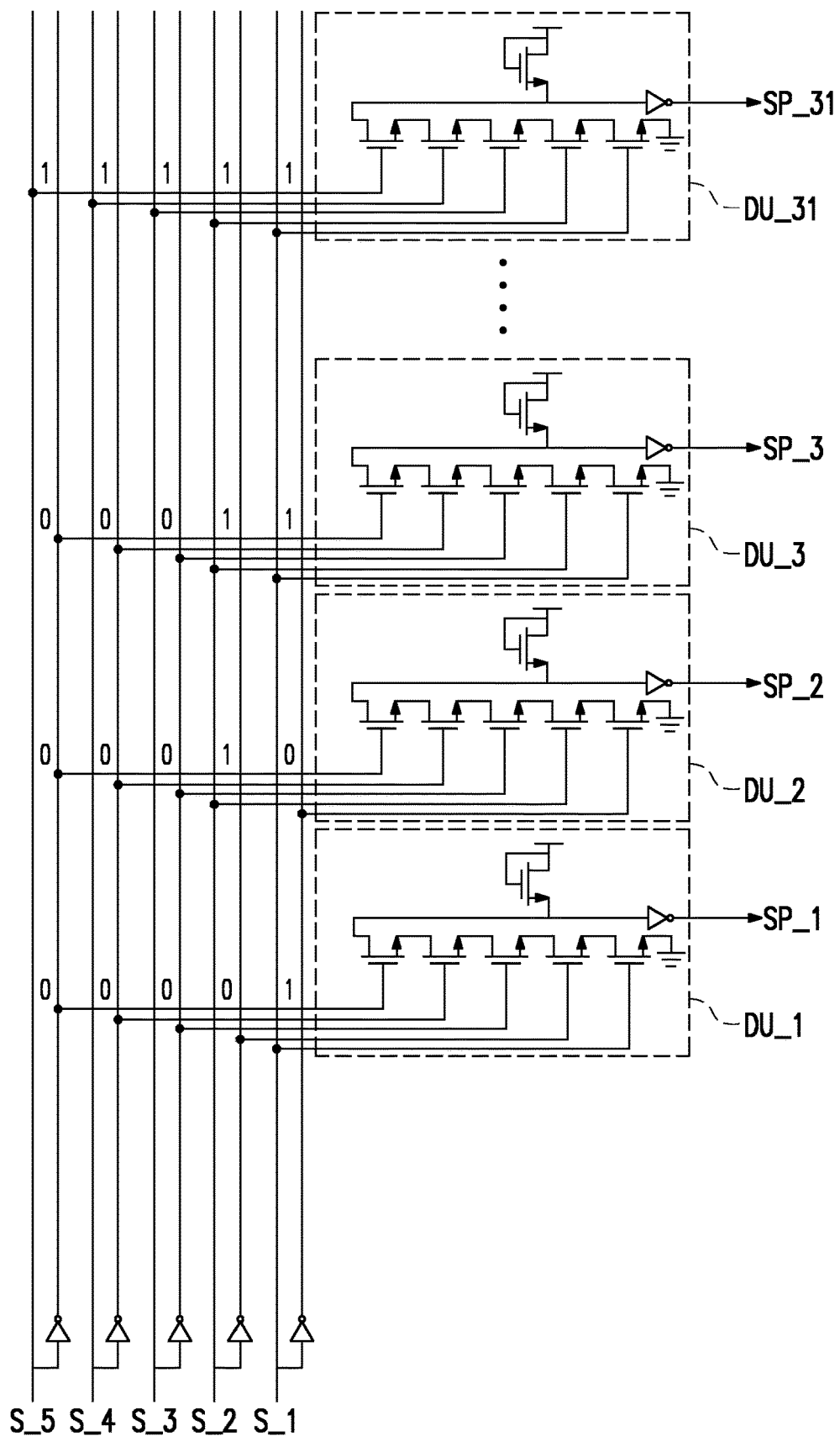

In the exemplary embodiment illustrated in FIG. 20, each of the decoder units DU_1 to DU_31 includes a plurality of input terminals, an output terminal, and a plurality of first logic units. In the exemplary embodiment illustrated in FIG. 20, the first logic units can be the NMOS transistors in each of the decoder units DU_1 to DU_31. In the exemplary embodiment illustrated in FIG. 20, the decoder unit DU_1 further includes an inverter coupled between the output terminal of the specific one of NMOS transistors (the first logic units) and the output terminal of the decoder unit DU_1. The decoder units DU_1 to DU_31 illustrated in FIG. 20 may be inferred with reference to the descriptions related to those illustrated in FIG. 15 and thus, will not be repeatedly described. In the exemplary embodiment illustrated in FIG. 20, the PMOS transistor in FIG. 15 is replaced with the diode-connected NMOS transistor in each of the decoder units DU_1 to DU_31.

Figure 21:
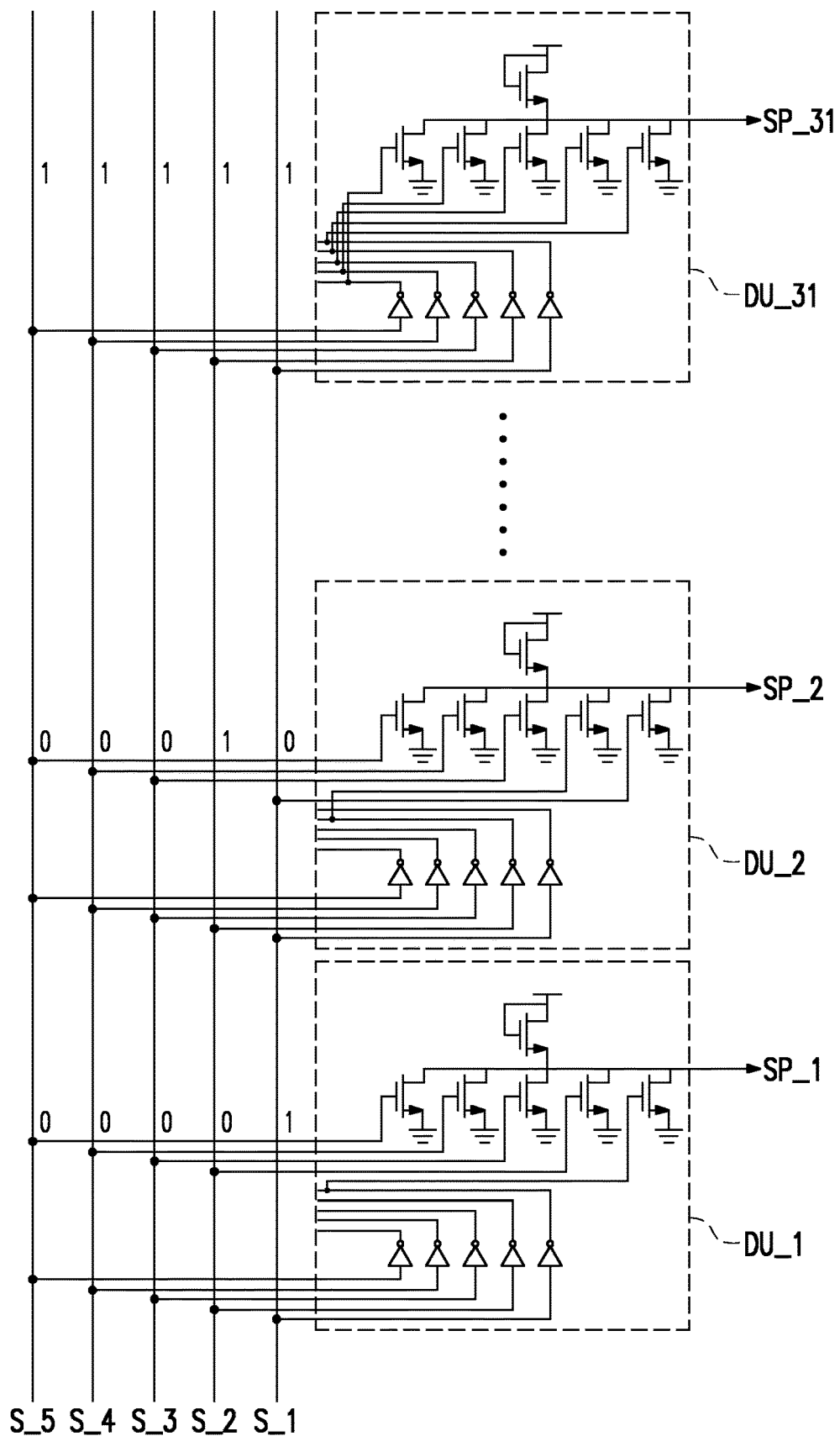

In the exemplary embodiment illustrated in FIG. 21, each of the decoder units DU_1 to DU_31 includes a plurality of input terminals, an output terminal, and a plurality of first logic units. In the exemplary embodiment illustrated in FIG. 21, the first logic units can be the NMOS transistors in each of the decoder units DU_1 to DU_31. The decoder units DU_1 to DU_31 illustrated in FIG. 21 may be inferred with reference to the descriptions related to those illustrated in FIG. 17 and thus, will not be repeatedly described. In the exemplary embodiment illustrated in FIG. 21, the PMOS transistor in FIG. 17 is replaced with the diode-connected NMOS transistor in each of the decoder units DU_1 to DU_31.

Figure 22:
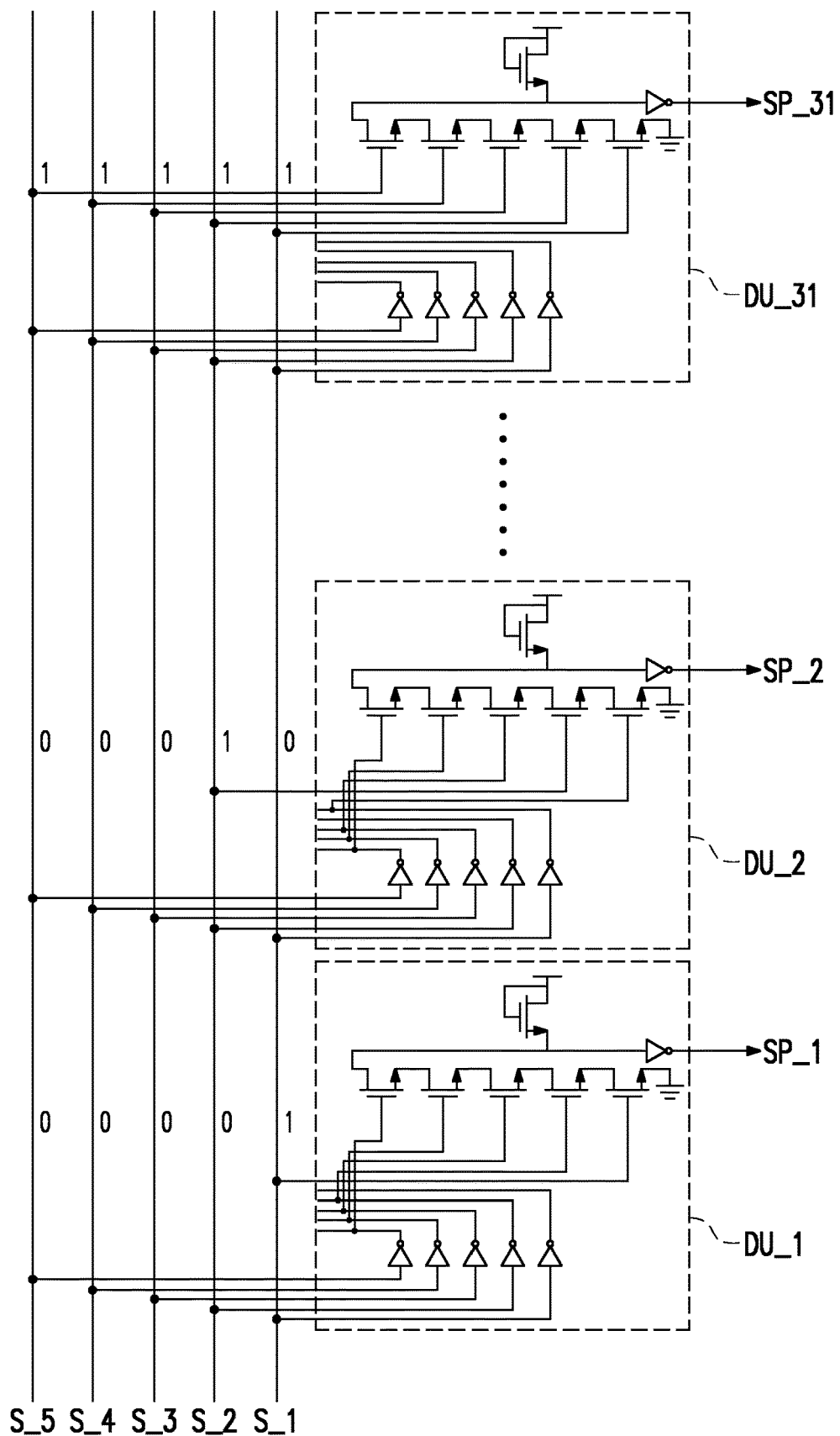

In the exemplary embodiment illustrated in FIG. 22, each of the decoder units DU_1 to DU_31 includes a plurality of input terminals, an output terminal, and a plurality of first logic units. In the exemplary embodiment illustrated in FIG. 22, the first logic units can be the NMOS transistors in each of the decoder units DU_1 to DU_31. In the exemplary embodiment illustrated in FIG. 22, the decoder unit DU_1 further includes an inverter coupled between the output terminal of the specific one of NMOS transistors (the first logic units) and the output terminal of the decoder unit DU_1. The decoder units DU_1 to DU_31 illustrated in FIG. 22 may be inferred with reference to the descriptions related to those illustrated in FIG. 18 and thus, will not be repeatedly described. In the exemplary embodiment illustrated in FIG. 22, the PMOS transistor in FIG. 18 is replaced with the diode-connected NMOS transistor in each of the decoder units DU_1 to DU_31.

Figure 23:
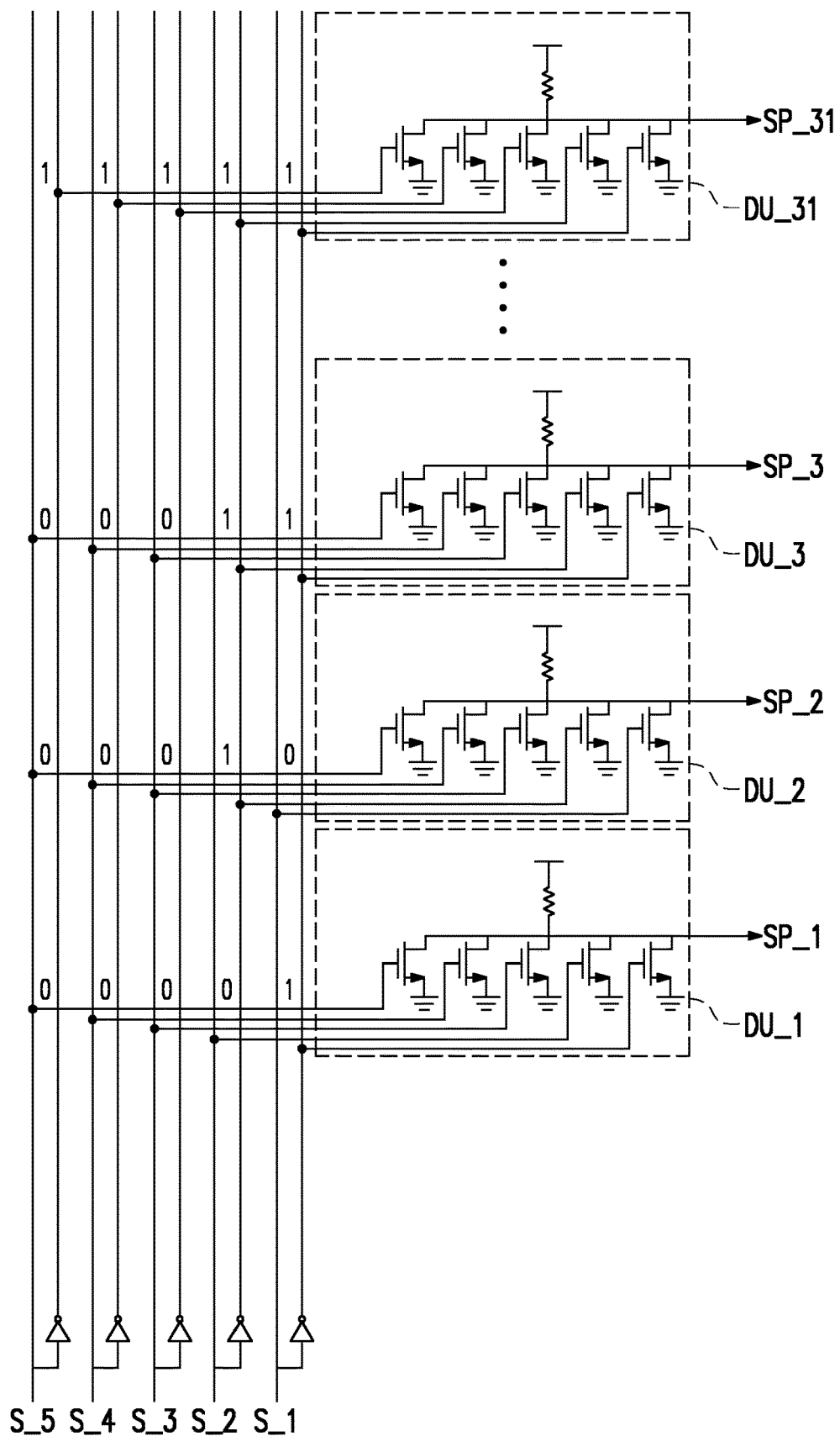

In the exemplary embodiment illustrated in FIG. 23, each of the decoder units DU_1 to DU_31 includes a plurality of input terminals, an output terminal, and a plurality of first logic units. In the exemplary embodiment illustrated in FIG. 23, the first logic units can be the NMOS transistors in each of the decoder units DU_1 to DU_31. The decoder units DU_1 to DU_31 illustrated in FIG. 23 may be inferred with reference to the descriptions related to those illustrated in FIG. 14 and thus, will not be repeatedly described. In the exemplary embodiment illustrated in FIG. 23, the PMOS transistor in FIG. 14 is replaced with a pull-high resistor in each of the decoder units DU_1 to DU_31.

Figure 24:
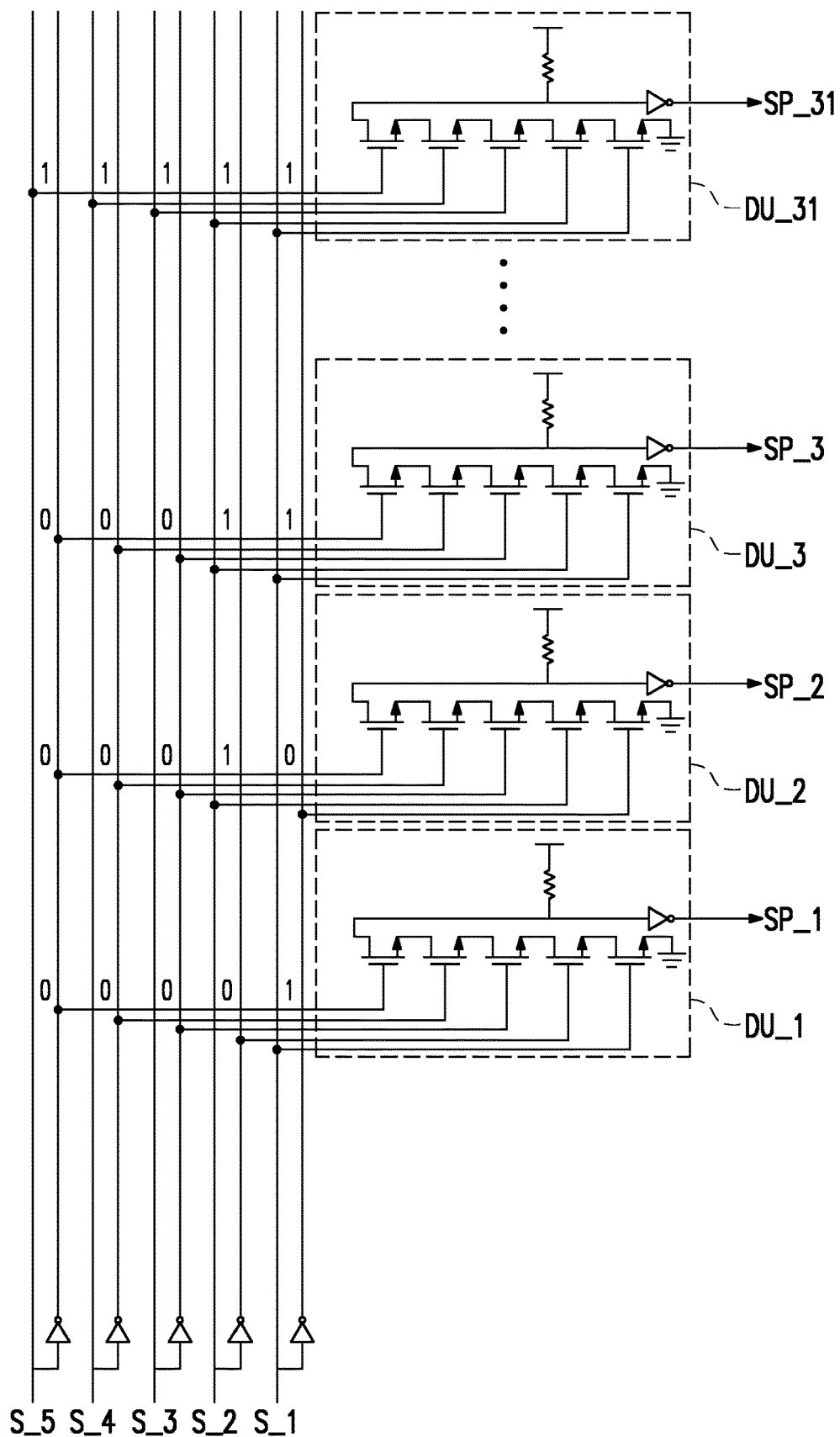

In the exemplary embodiment illustrated in FIG. 24, each of the decoder units DU_1 to DU_31 includes a plurality of input terminals, an output terminal, and a plurality of first logic units. In the exemplary embodiment illustrated in FIG. 24, the first logic units can be the NMOS transistors in each of the decoder units DU_1 to DU_31. In the exemplary embodiment illustrated in FIG. 24, the decoder unit DU_1 further includes an inverter coupled between the output terminal of the specific one of NMOS transistors (the first logic units) and the output terminal of the decoder unit DU_1. The decoder units DU_1 to DU_31 illustrated in FIG. 24 may be inferred with reference to the descriptions related to those illustrated in FIG. 15 and thus, will not be repeatedly described. In the exemplary embodiment illustrated in FIG. 24, the PMOS transistor in FIG. 15 is replaced with a pull-high resistor in each of the decoder units DU_1 to DU_31.

Figure 25:
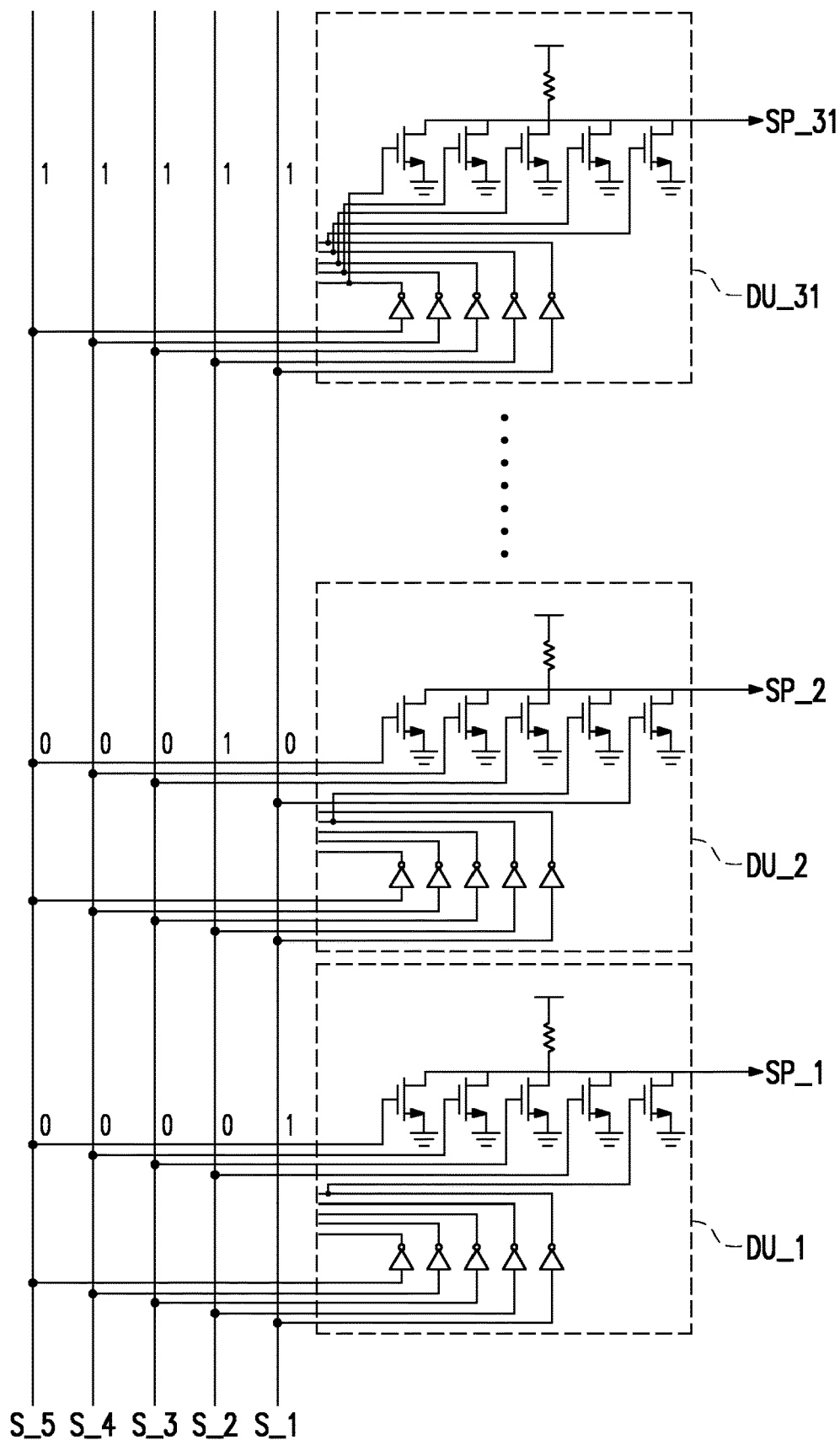

In the exemplary embodiment illustrated in FIG. 25, each of the decoder units DU_1 to DU_31 includes a plurality of input terminals, an output terminal, and a plurality of first logic units. In the exemplary embodiment illustrated in FIG. 25, the first logic units can be the NMOS transistors in each of the decoder units DU_1 to DU_31. In the exemplary embodiment illustrated in FIG. 25, each of the decoder units DU_1 to DU_31 further comprises a plurality of inverters. The decoder units DU_1 to DU_31 illustrated in FIG. 25 may be inferred with reference to the descriptions related to those illustrated in FIG. 17 and thus, will not be repeatedly described. In the exemplary embodiment illustrated in FIG. 25, the PMOS transistor in FIG. 17 is replaced with a pull-high resistor in each of the decoder units DU_1 to DU_31.

Figure 26:
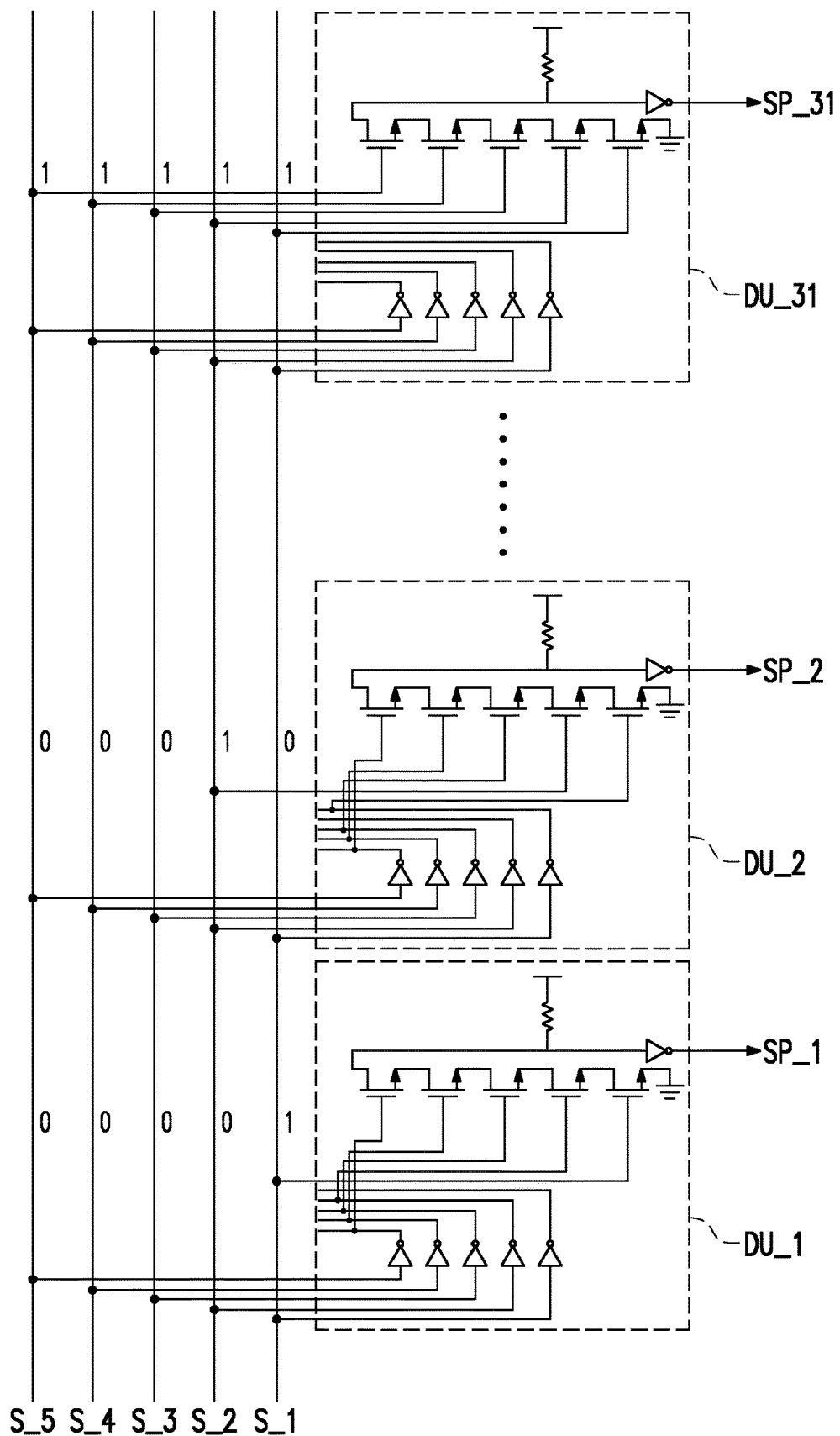

In the exemplary embodiment illustrated in FIG. 26, each of the decoder units DU_1 to DU_31 includes a plurality of input terminals, an output terminal, and a plurality of first logic units. In the exemplary embodiment illustrated in FIG. 26, the first logic units can be the NMOS transistors in each of the decoder units DU_1 to DU_31. In the exemplary embodiment illustrated in FIG. 26, each of the decoder units DU_1 to DU_31 further comprises a plurality of inverters. The decoder units DU_1 to DU_31 illustrated in FIG. 26 may be inferred with reference to the descriptions related to those illustrated in FIG. 18 and thus, will not be repeatedly described. In the exemplary embodiment illustrated in FIG. 26, the PMOS transistor in FIG. 18 is replaced with a pull-high resistor in each of the decoder units DU_1 to DU_31.

According to different design requirements, the blocks of the fingerprint sensing control circuit 120, the selecting circuit 122, the fingerprint reading circuit 123 and (or) the control circuit 124 may be implemented in a form of hardware, firmware, software (i.e., programs) or in a combination of many of the aforementioned three forms.

In terms of the hardware form, the blocks of the fingerprint sensing control circuit 120, the selecting circuit 122, the fingerprint reading circuit 123 and (or) the control circuit 124 may be implemented in a logic circuit on a integrated circuit. Related functions of the fingerprint sensing control circuit 120, the selecting circuit 122, the fingerprint reading circuit 123 and (or) the control circuit 124 may be implemented in the form of hardware by utilizing hardware description languages (e.g., Verilog HDL or VHDL) or other suitable programming languages. For example, the related functions of the fingerprint sensing control circuit 120, the selecting circuit 122, the fingerprint reading circuit 123 and (or) the control circuit 124 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the fingerprint sensing control circuit 120, the selecting circuit 122, the fingerprint reading circuit 123 and (or) the control circuit 124 may be implemented in a logic circuit on a integrated circuit. For example, the fingerprint sensing control circuit 120, the selecting circuit 122, the fingerprint reading circuit 123 and (or) the control circuit 124 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

In light of the foregoing, the fingerprint sensing control circuit (the chip) provided by the embodiments of the invention can output the start pulse signals to the panel. The start pulse signals are related to a selected fingerprint zone among the fingerprint zones of the panel. The panel can generate a plurality of scan signals according to the start pulse signals, and the scan signals are provided to the selected fingerprint zone. The number of the start pulse signals is less than the number of fingerprint zones. The start pulse signals can be decoded to indicate the selected fingerprint zone. The start pulse signals can be decoded to provide to the shift register groups respectively. Thus, the electronic device can achieve reducing the number of start pulse signals output by the fingerprint sensing control circuit (the chip) to the panel as many as possible.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A chip capable of controlling a panel to perform fingerprint sensing, wherein the panel comprises a plurality of fingerprint sensing pixels and a plurality of gate lines arranged along a first direction of the panel for controlling the fingerprint sensing pixels, the fingerprint sensing pixels are divided into a first number of fingerprint zones along a second direction of the panel, and the chip comprises:
a control circuit, configured to provide a plurality of control signals to the panel for controlling the panel to perform fingerprint sensing, wherein the control signals comprise a second number of start pulse signals used to indicate a selected fingerprint zone, the first number is greater than the second number, and the second number of the start pulse signals are used to be provided to a decoder disposed on the panel, and the decoder determines the selected fingerprint zone according to logic values of the second number of the start pulse signals.

2. The chip according to claim 1, wherein the start pulse signals are used for controlling the gate lines of the panel.

3. The chip according to claim 2, wherein the start pulse signals are provided to a gate on array (GOA) circuit of the panel configured to generate a plurality of scan signals respectively for controlling the gate lines of the panel.

4. The chip according to claim 3, wherein the GOA circuit comprises a plurality of shift register groups each coupled to a corresponding one of the fingerprint zones and operating according to all of the second number of start pulse signals.

5. The chip according to claim 3, wherein the scan signals are configured to control the fingerprint sensing pixels to perform resetting operation and/or selecting/writing operation.

6. The chip according to claim 1, further comprising:
a selecting circuit, configured to obtain information about a selected fingerprint zone among the first number of fingerprint zones of the panel, wherein the control circuit is coupled to the selecting circuit to receive the information about the selected fingerprint zone.

7. The chip according to claim 6, wherein the selecting circuit is configured to receive the information about the selected fingerprint zone from a processor configured to determine the selected fingerprint zone according to touch information.

8. The chip according to claim 7, wherein the processor is configured to receive the touch information from a touch control circuit configured to control touch sensing on the panel.

9. The chip according to claim 1, wherein the control circuit comprises:
a first start pulse generating circuit, configured to provide the second number of start pulse signals according to information about the selected fingerprint zone.

10. The chip according to claim 9, wherein the first start pulse generating circuit is a binary start pulse generating circuit.

11. The chip according to claim 9, wherein each of the second number of start pulse signals has a respective logic state, the respective logic state has a plurality of logic values, and the control circuit further comprises an encoding circuit configured to encode an index number of the selected fingerprint zone as the logic values of the start pulse signals of the second number of start pulse signals.

12. The chip according to claim 9, wherein the control circuit is configured to provide different numbers of start pulse signals under different settings.

13. The chip according to claim 12, wherein the control circuit further comprises:
- a second start pulse generating circuit, configured to provide a third number of start pulse signals according to information about the selected fingerprint zone, wherein the third number is not equal to the second number; and
- a switching circuit, coupled to the first start pulse generating circuit and the second start pulse generating circuit, and configured to select the second number of start pulse signals or the third number of start pulse signals as the control signals.

14. The chip according to claim 13, wherein the second start pulse generating circuit is a thermometer-code start pulse generating circuit or an one-hot code pulse generating circuit.

15. The chip according to claim 13, wherein the third number is equal to the first number.

16. The chip according to claim 13, wherein a logical state set of the second number of start pulse signals and the selected fingerprint zone have a first mapping relationship therebetween, and a logical state set of the third number of start pulse signals and the selected fingerprint zone have a second mapping relationship therebetween, wherein the first mapping relationship is different from the second mapping relationship.

17. The chip according to claim 1, wherein the decoder obtains information about the selected fingerprint zone according to the logic values of the second number of start pulse signals.

18. The chip according to claim 17, wherein the second number of start pulse signals are used to be provided to the decoder to provide a fourth number of start pulses each for selecting a corresponding one of the first number of fingerprint zones, wherein the fourth number is equal to the first number.

19. The chip according to claim 17, wherein the decoder comprises a plurality of decoder units each corresponding to one of the fingerprint zones.

20. The chip according to claim 19, wherein all of the second number of start pulse signals are provided to each of the decoder units.

21. The chip according to claim 1, wherein each of the second number of start pulse signals has a respective logic state, and a logical state set of the second number of start pulse signals and the selected fingerprint zone have a first mapping relationship therebetween.

22. The chip according to claim 21, wherein the selected fingerprint zone is indicated according to a mathematical formula of the logic values of the second number of start pulse signals, wherein the mathematical formula is $NF = \sum_{i=0}^{N_2-1} S\_(i+1) \cdot 2^i$, wherein NF is an index number of the selected fingerprint zone, $S\_(i+1)$ is a logic value of an $(i+1)^{th}$ start pulse signal $S\_(i+1)$, i is an integer from 0 to $N_2-1$, and $N_2$ is the second number.

23. The chip according to claim 1, wherein the fingerprint sensing pixels are optical fingerprint sensing pixels capable of sensing light.

24. The chip according to claim 1, wherein selection for each of the fingerprint zones depends upon all of the second number of start pulse signals.

* * * * *